US011306574B2

United States Patent
Bang et al.

(10) Patent No.: US 11,306,574 B2
(45) Date of Patent: Apr. 19, 2022

(54) NANOPARTICLE-BASED STIMULATION FLUID AND METHODS OF USE IN SUBTERRANEAN FORMATIONS

(71) Applicant: The Board of Regents of the University of Oklahoma, Norman, OK (US)

(72) Inventors: Sangho Bang, Durham, NC (US); Bor Jier Shiau, Norman, OK (US); Jeffrey H. Harwell, Norman, OK (US); Elsayed R. Abdelfatah, Calgary (CA); Maysam Pournik, Mission, TX (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 149 days.

(21) Appl. No.: 16/678,864

(22) Filed: Nov. 8, 2019

(65) Prior Publication Data
US 2020/0148943 A1    May 14, 2020

Related U.S. Application Data

(60) Provisional application No. 62/757,608, filed on Nov. 8, 2018.

(51) Int. Cl.
*E21B 43/28* (2006.01)
*C09K 8/58* (2006.01)
*C09K 8/60* (2006.01)

(52) U.S. Cl.
CPC ............ *E21B 43/28* (2013.01); *C09K 8/58* (2013.01); *C09K 8/60* (2013.01); *C09K 2208/10* (2013.01)

(58) Field of Classification Search
None
See application file for complete search history.

(56) References Cited

U.S. PATENT DOCUMENTS

| 4,732,213 | A | * | 3/1988 | Bennett | ............... C09K 8/50 166/292 |
|---|---|---|---|---|---|
| 2013/0175037 | A1 | * | 7/2013 | Crews | ............... C09K 8/5045 166/305.1 |
| 2013/0292120 | A1 | * | 11/2013 | Patil | ............... C09K 8/506 166/293 |
| 2014/0116695 | A1 | * | 5/2014 | Maghrabi | ............... C09K 8/74 166/279 |

OTHER PUBLICATIONS

Otsubo, Y., et al., "Rheology of oil-in-water emulsions"; Rheol Acta 33 (1994) 29-37.
Jones, A.T., et al., "Improving the Efficiency of Matrix Acidizing With a Succinoglycan Viscosifier"; SPE Productions & Facilities (1996) 144-149.

(Continued)

*Primary Examiner* — Andrew Sue-Ako
(74) *Attorney, Agent, or Firm* — Hall Estill Law Firm

(57) ABSTRACT

Compositions of nanoparticle-based stimulation fluids and methods of use for acid diversion from high permeability zones into low permeability zones to achieve deep penetration of wormholes in subterranean formations, such as carbonate formations. Certain embodiments include a gel precursor composition comprising metal oxide nanoparticles, such as silicon dioxide nanoparticles as a gelling agent, and magnesium chloride.

14 Claims, 19 Drawing Sheets

(56) References Cited

OTHER PUBLICATIONS

Pal, R.; "Viscosity and storage/loss moduli for mixtures of fine and coarse emulsions"; Chemical Engineering Journal 67 (1997) 37-44.
Jones, A.T., et al., "Quantifying Acid Placement: The Key to Understanding Damage Removal in Horizontal Wells", SPE Production & Facilities (1998) 163-169.
Jager-Lezer, N., et al., "Rheological analysis of highly concentrated w/o emulsions", Rheol Acta 37 (1998) 129-138.
Woo, G.T., et al., "A New Gelling System for Acid Fracturing", SPE International, SPE 52169 (1999) 10 pages.
Buijse, M.A., et al., "Novel Application of Emulsified Acids to Matrix Stimulation of Heterogeneous Formations", SPE Production & Facilities 15:3 (2000) 208-213.
Chang, F., et al., "A Novel Self-Diverting-Acid Developed for Matrix Stimulation of Carbonate Reservoirs", SPE International, SPE 65033 (2001) 6 pages.
Lynn, J.D., et al., "A core based comparison of the reaction characteristics of emulsified and in-situ gelled acids in low permeability, high temperature, gas bearing carbonates", SPE International, SPE 65386 (2001) 16 pages.
Alleman, D., et al., "The Development and Successful Field Use of Viscoelastic Surfactant-based Diverting Agents for Acid Stimulation", SPE International, SPE 80222 (2003) 10 pages.
Nasr-El-Din, H.A., et al., SPE Production & Operations (2007) 112-120.
Kalfayan, L.J., et al., "The Art and Practice of Acid Placement and Diversion: HIsotry, Present State and Future", SPE International, SPE 124141 (2009) 17 pages.
Gomaa, A.M., et al., "Rheological and Core Flood Studies of Gelled and In-Situ Gelled Acids", SPE International, SPE 128056 (2010) 17 pages.
Gomaa, A.M., et al., "Laboratory Study of Diversion Using Polymer-Based In-Situ-Gelled Acids", SPE Production & Operations (2011) 278-290.
Sayed, M.A., et al., "Effect of Emulsifier Concentration and Acid Volume Fraction on the Elastic Properties of Emulsified Acids", SPE International, SPE 141664 (2011) 11 pages.
Madyanova, M., et al., "Effective Matrix Stimulation of High-Temperature Carbonate Formations in South Sumatra Through the Combination of Emulsified and Viscoelastic Self-Diverting Acids", SPE International, SPE 151070 (2012) 13 pages.
Hull, K.L., et al., "Recent Advances in Viscoelastic Surfactants for Improved Production From Hydrocarbon Reservoirs", SPE Journal (2016) 18 pages.

\* cited by examiner $P_{max}$(injection)= 16.4 psi $P_{max}$(injection)=10 psi

<Inlet of S1 and S2, 15% HCl HT>

<Outlet of S1 and S2, 15% HCl HT>

<Inlet>

<Outlet>

NANOPARTICLE-BASED STIMULATION FLUID AND METHODS OF USE IN SUBTERRANEAN FORMATIONS

CROSS-REFERENCE TO RELATED APPLICATIONS

The present patent application incorporates by reference the entire provisional patent application identified by U.S. Ser. No. 62/757,608, filed on Nov. 8, 2018, and claims priority thereto under 35 U.S.C. 119(e).

BACKGROUND

Due to the intrinsic and unique geological and hydrogeological properties of limestones (largely of carbonate composition), it is quite challenging to recover a high percentage of entrapped hydrocarbon in this type of subterranean formation, as compared to sandstones rocks. Thus, for petroleum practitioners and engineers to overcome this limitation, one of the common approaches involves injection of a strong acid solution to partially dissolve the limestone and increase the permeability of the rock ("stimulation"). This so called "matrix acidizing" can be applied to significantly improve hydrocarbon recovery from production wells and to increase the injection capacity of waste disposal injection wells. The goal of the acidizing treatment is not to dissolve the bulk rock matrix, but rather to selectively generate deep-penetrating wormholes into the rock surrounding the well bore, thus increasing the surface area of the well-bore without reducing mechanical integrity.

Inorganic hydrochloric acid solutions (HCl) have been widely used by industry for stimulation operations due to HCl's reasonable cost and rapid carbonate-dissolving capacity. The drawback of HCl acidizing is that it mainly creates shallow surface dissolution of limestones. This problem is especially severe in subterranean environments under conditions of elevated temperature, and with highly heterogeneous rocks. For example, during stimulation operations, the injected acid is consumed mostly in the most permeable rock and has less impact on dissolving low permeability rock, when multiple heterogeneous, stratified, layers exist. As a result, the efficiency of an acid stimulation treatment is largely controlled by the contrast in rock permeability. For a large permeability contrast between different layers, the injected acid solution penetrates easily and deeply in the high permeability zones thus leaving the low permeability zones virtually untouched. Achieving effective flow "diversion" of the acid from the high permeability zones into the low permeability zones, to enhance the efficiency of the stimulation operation, is the critical step in highly successful acidizing treatments for enhancing hydrocarbon production from subterranean oil-bearing formations.

There are two main technical approaches to create effective diversion of the acid, mechanical-diversion and chemical-based diversion. For example, installation of opposed cup packers, squeeze packers, coiled tubing, and ball sealers are commonly used mechanical diversion techniques. These techniques have intrinsic uncertainty and limitations. For example, use of coiled tubing has an ability to attach the injection nozzles to reach certain zone in wells that exhibit high water production rates. However, adoption of smaller diameter nozzles causes much higher friction losses and increasing pressure which inevitably reduces the injection rate. Solid-form particulate diverters or ball sealers are very difficult to evenly distribute in the coiled tubing. To use ball sealers in diversion, the selected small balls are first pumped into wells along with stimulation fluids to properly seat the ball on perforations to form a temporary seal. However, it has been argued that this is not effective in cased and perforated horizontal wells due to difficulties in seating the balls at the perforations along the top side of the pipe. Installation of downhole packers can be used to prevent fluid flow at the end of tubing to direct fluids into intervals with minimum or no flow. However, this is expensive and only guarantees fluid entry into a single interval; to treat multiple intervals requires repositioning of the packers after each acid treatment.

The main options for chemical-based diversion include injection of organic acids, gelled acids, in-situ gelled acids, emulsified acids, and viscoelastic acids. Organic acids such as acetic acid and formic acid are used due to their lower corrosivity and the relative ease with which their corrosivity can be passivated at high temperatures. Based on the cost of acid per unit, associated with acid dissolving power, organic acids are more expensive than hydrochloric acid. They also have lower viscosity which is unfavorable for treating large permeability contrast ratios in multilayered zones. The in-situ gelled acid technique involves injecting multiple compounds, including polymer (a gelling material used to increase the viscosity of the acid), the crosslinkers (e.g., ferric chloride, where the $Fe^{+3}$ ions are used in crosslinking the individual polymer chains at pH 2, which significantly increases fluid viscosity), the breaker (e.g., sodium erythorbate used to reduce the ferric ions to ferrous ($Fe^{+2}$) ions, reducing the viscosity gain caused by the presence of ferric ions), corrosion inhibitor and buffer (hydroxyacetic acid), which initiates polymer degradation and whose active ligand removes the metal ions from the polymer to allow further degaration of the polymer gel, in turn reducing the viscosity. Data also show that the in-situ gelled acid system tends to exhibit the plugging issues that were inherent with the conventional cross-linked acid gellants. It has been noticed that in-situ gelled acid caused a loss in the permeability in tight carbonate cores because of polymer-gel retention at the core face. Prior work has shown that face plugging caused by in-situ polymer gelled acid occurred in low and high permeability core, and occurred more severely at lower flow rates.

Another approach, the use of viscoelastic (VES) acid systems, develops high viscosity by forming micellar structures to crosslink the polymer chains. For this system to work, proper pH control is crucial for achieving the desired viscosity. At low pH values, the viscosity of the system is low, allowing the acid system to flow freely and penetrate deep into the subterranean matrix. On further increasing pH, the concentration of divalent calcium ions in solution increases during the reactions of acid with carbonates. The divalent ions begin associating with the micellar structures and eventually increase viscosity because of structure alternation. However, the viscosity of VES fluids can decrease upon mixing with hydrocarbons. This may make it unfavorable when used with dry-gas wells. Also, some suggested that limited penetration of acid into the formation due to relatively fast reaction rates can cause unfavorable consumption of the injected acid near the wellbore preventing development of deep penetrating wormholes and, even worse, decreasing the formation integrity in the near wellbore regions due to face dissolution. Addition of emulsified acids were extensively used in matrix stimulation. HCl is usually used as the internal phase of the emulsion and diesel is used as external oily phase, acting as a diffusion barrier to promote the creation of deep wormholes. However, successful application of matrix-acid treatments in heterogeneous formations or large-permeability-contrast formations appears necessary by requiring a diverting-agent stage and then treatment of the well with the emulsified acid. It has been shown that the stability of the emulsion is significantly reduced as the concentration of corrosion inhibitor increases, particularly under elevated temperature conditions.

DETAILED DESCRIPTION

Figure 1:
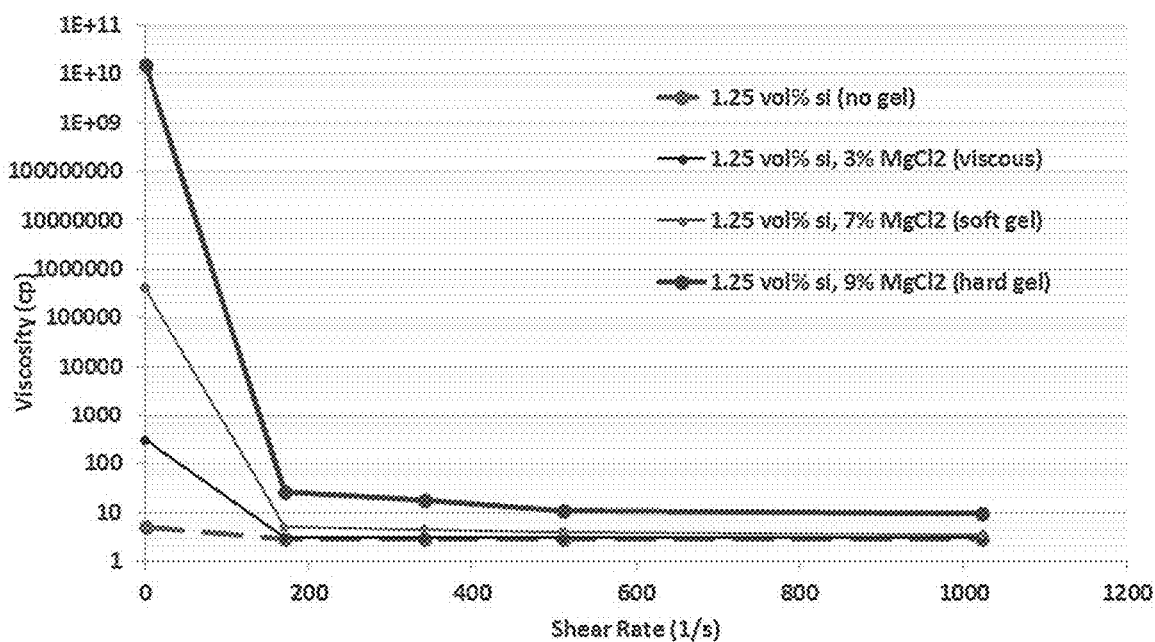
FIG. 1 shows viscosity of silica-$MgCl_2$ formulations at different concentrations of $MgCl_2$. 1.25 vol % Si only—no gel (<10 cp), 1.25 vol % Si+3 wt % $MgCl_2$ (viscous, $10^{2-3}$ cp), 1.25 vol % Si+7 wt % $MgCl_2$ (soft gel, $10^{4-9}$ cp), 1.25 vol % Si+9 wt % $MgCl_2$ (hard gel, $10^{10-13}$ cp). 1.25 vol % of silica is equal to 0.033 wt %.

In-situ gelled acids are used to retard acid-rock surface reaction rate in matrix acidizing treatments by increasing fluid viscosity. The present disclosure is directed to compositions of nanoparticle-based stimulation fluids and methods of their use for acid diversion from high permeability zones into low permeability zones to achieve deep penetration of wormholes in subterranean formations, such as but not limited to carbonate formations. In at least one embodiment, the present disclosure includes a gel precursor composition comprising metal oxide nanoparticles, such as but not limited to, silicon dioxide (silica) nanoparticles as a gelling agent, and magnesium chloride, which is introduced to modify the surface properties of the silica nanoparticles to achieve "instant" gelation under proper pH and temperature conditions underground, and an acid, such as HCl.

The compositions of the present disclosure exhibit significant differences from other stimulation technologies. First, they result in a pseudo-solid gel which exhibits both strength and rigidity even at a very low volume fraction of nanoparticles. When the gel precursor (i.e., the nanoparticle-$MgCl_2$-HCl mixture, also referred to herein as the treatment mixture) directly contacts the underground carbonate rock, dissolution of the carbonate results in an increase of pH which leads to instantaneous generation of gel networks. The resulting gel exhibits pseudo-solid behavior when total particle volume fractions are kept greater than 0.75% v/v in the presence of 7 wt % $MgCl_2$ at room temperature (23° C.). For example, when a formulation comprising a total particle volume fraction greater than 0.75% v/v and 7 wt % $MgCl_2$ is combined with 15 wt % HCl at room temperature, it instantly produces soft gel networks which change to pseudo-solid gel after equilibrating for 35 minutes at elevated temperatures (e.g., 90° C.).

Second, the formulations are a single-stage acidizing system that achieves the dual purposes of self-diversion and deep penetration, and so eliminates the need for multiple-stage operations via injection of different fluids sequentially. This can minimize the number of treatment stages and project cost in field applications. Currently, applying different fluid systems in multiple stages acidizing treatment drastically increases the logistical issues and complexity at the field and is much less favorable for the operation.

Third, the formulations of the present disclosure exhibits distinct shear thinning behavior. When no shear rate is applied, the solution forms a gel and the gel can be completely transformed into a low viscosity fluid by increasing the shear rate. In other words, the gel viscosity or the mechanical strength can be easily manipulated by altering the operating shear rate during acidizing treatment operations. Thus, the formulations disclosed here can be easily adjusted to apply for a variety of permeability contrast ratios between different subterranean depths.

Fourth, the formulations possess excellent tolerance of harsh salt and temperature conditions. In one non-limiting example, a gel-producing, stable dispersion of nanoparticles was prepared with 20% of total dissolved solids (TDS) at 90° C.

Fifth, the formulations will reduce lifting costs and environmental concerns as well as maintaining the longevity of the producing wells. In certain formations, the formulations can provide an effective water cutoff treatment for wells that produce excessive amounts of unwanted formation water that are currently disposed of in salt-water injection wells, which have been connected to induced seismicity.

The new stimulation formulations described herein thus provide significant improvements and benefits for acidizing treatment practice, both technically and economically.

Before describing various embodiments of the present disclosure in more detail by way of exemplary descriptions, examples, and results, it is to be understood that the present disclosure is not limited in application to the details of systems, methods, and compositions as set forth in the following description. The methods of the present disclosure are capable of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the methods of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the concepts of the present disclosure, the following terms, unless otherwise indicated, shall be understood to have the following meanings:

The use of the word "a" or "an," or of the phrase "at least a first," when used in the claims and/or the specification may mean "one," "one or more," "at least one," or "one or more than one." The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" is used to indicate that a value includes the inherent variation or error for the device or the method being employed to determine a value. For example but not by way of limitation, when the term "about" is utilized, the designated value may vary by plus or minus fifteen percent, plus or minus twelve percent, or plus or minus eleven percent, or plus or minus ten percent, or plus or minus nine percent, or plus or minus eight percent, or plus or minus seven percent, or plus or minus six percent, or plus or minus five percent, or plus or minus four percent, or plus or minus three percent, or plus or minus two percent, or plus or minus one percent, or plus or minus one-half percent.

The use of the term "at least one" will be understood to include one as well as any quantity more than one, including but not limited to, 2, 3, 4, 5, 6, 7, 8, 9, 10, 11, 12, 13, 14, 15, 16, 17, 18, 19, 20, 21, 22, 23, 24, 25, 30, 35, 40, 45, 50, 55, 60, 65, 70, 75, 80, 85, 90, 95, 100, or more. The term "at least one" may extend up to 500 or 1000 or more, depending on the term to which it is attached; in addition, the quantities of 500/1000 are not to be considered limiting, as higher limits may also produce satisfactory results. In addition, the use of the term "at least one of X, Y and Z" will be understood to include X alone, Y alone, and Z alone, as well as any combination of X, Y and Z. The use of ordinal number terminology (i.e., "first", "second", "third", "fourth", etc.) is solely for the purpose of differentiating between two or more items and is not meant to imply any sequence or order or importance to one item over another or any order of addition, for example.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

In this detailed description and the appended claims, each numerical value (e.g., temperature or time) should be read once as modified by the term "about" (unless already expressly so modified), and then read again as not so modified unless otherwise indicated in context. Also, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Further, an embodiment having a feature characterized by the range does not have to be achieved for every value in the range, but can be achieved for just a subset of the range. For example, where a range covers units 1-10, the feature specified by the range could be achieved for only units 4-6 in a particular embodiment.

As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

Where used herein in reference to viscosity, the term "cp" refers to "centipoise", the unit of measurement for the dynamic viscosity of a fluid.

Shear rate is measured as reciprocal seconds (1/s, or $s^{-1}$), derived from radiant per second, wherein radiant is dimensionless.

In certain embodiments of the present disclosure, the subterranean formation comprises carbonates (e.g., limestones and dolostones), and/or sandstone, and/or clastic sedimentary rock, and/or shale. In certain embodiments, the compositions and methods described in the present disclosure can be used for acidizing a well formation, for enhancing oil and/or gas recovery, or for enhancing injectivity into a wastewater disposal well or a drill cuttings disposal well.

EXAMPLES

The embodiments of the present disclosure, having now been generally described, will be more readily understood by reference to the following examples and embodiments, which are included merely for purposes of illustration of certain aspects and embodiments of the present disclosure, and are not intended to be limiting. The following detailed examples of systems and/or methods of use of the present disclosure are to be construed, as noted above, only as illustrative, and not as limitations of the disclosure in any way whatsoever. Those skilled in the art will promptly recognize appropriate variations from the various structures, components, compositions, procedures, and methods.

Example 1

Gel Precursor: Surface Mg-Modified $SiO_2$ Gel+15% HCl

The gel precursor was prepared by mixing Silica particles with deionized water then sonicated by Ultrasonic Dismembrator (Fisher Scientific Model 500) with the amplitude of 20% for 20 minutes. HCl (up to 15 wt %) was added under stirring. $MgCl_2$ powder (up to 9 wt %) was gradually added to the solution under stirring to form the gel precursor solution. The silica particles were Silica Fumed 0.007 U (Sigma Aldrich, Part #: S5130). Magnesium chloride was $MgCl_2$, Anhydrous (Sigma Aldrich, Part #: M8266). The HCl was manufactured by SMART Chemicals at a concentration of 31.45 wt %.

This nanoparticle-based gel precursor can be used to form an in-situ gelled acid in high-temperature subterranean formations while most water-soluble polymer gels (the most commonly used gellants in acidizing treatment) will degrade rapidly in acid solution at temperatures exceeding about 130° F. Also, the present system exhibits lower friction loss in tubular wells compared to polymer-based gelled acids. The presently disclosed nanoparticle-based in-situ gelled acid did not significantly reduce injectivity since most of the nanoparticles were transported into the growing wormholes where they formed in-situ gels simultaneously, based on the results of our parallel coreflood tests.

This acid-nanoparticle system creates an in-situ gelled acid when the mixture of silica and magnesium chloride form pseudo-solid shear thinning gels. The gel is formed by strong interparticle interactions at specific pH values, particle/$MgCl_2$ concentrations, shear rate, and temperatures. When the gel precursor is co-injected into low and high permeability zones, this single stage in-situ gelled acid diverts acid into lower permeability zone creating wormholes in both the high and low permeability zones simultaneously, thus eliminating the need for using mechanical packers to isolate the low permeability zones before acidizing.

Example 2

Emulsified Acid: Hydrophobic Silica Assisted Emulsified Acid

The gel precursor was prepared by dissolving the desired amounts of a cationic surfactant (e.g., benzethonium chloride) and an anionic co-surfactant (e.g., alkyl ethoxylate sulfate, such as Steol CS 460 from Stepan Company) in 10% brine to constitute an emulsifier. 15 wt % HCl, an amount of diesel oil or crude oil, and the emulsifier were mixed under stirring, after which a hydrophobic silica (e.g., Aerosil R805) was added into the solution under stirring. The dispersal of the acid in the diesel or crude oil serves to protect well components such as pumps, tubing and valves from the concentrated acid. Emulsified acids contain strong acid solution as the internal phase and oil as the external phase, which reduces contact of the strong acid with the metal constituents of the well. The emulsified acid improves the inhibition of corrosion by reducing the direct contact between acid and metal. Also, it enhances the formation of wormholes at high temperature by reducing the direct contact between acid and formation. Solid-stabilized (or so called, Pickering) emulsion between nanoparticle and oil interfaces can significantly improve the stability of acid/oil emulsion. Emulsification created by the mixed nanoparticle and surfactant system can boost fluid viscosity dramatically and the presence of oily external phase effectively retard the transfer rate of acid injected into the rock. This rate reduction drastically improves the penetration depth of the injected acid.

Example 3

Viscosity Results

These viscosity results provide specific formulations that can be designed for different field treatments in large openings, including open fractures, caves, and wormholes. In this example, $MgCl_2$ is used as a crosslinker to form a gel composition with wide range of viscosity ($10^{10}$ to 1 cp) which can be used in different applications. Since excess water production in oil fields is a challenging economic and environmental problems as more reservoirs mature, efficient conformance treatment is highly required. An estimated average of 3 bbl of unwanted water is produced for each barrel of oil produced worldwide. In order to treat and dispose unwanted water produced in oil fields, approximately $50 billion is spent per year. Therefore, there is a high demand for efficient conformance control.

Blocking performance is an important parameter for conformance treatment. For example, blocking performance increased as gel strength increased and conduit-size conductivity can significantly decrease when a strong gel is used for the conformance control. FIG. 1 shows that there is a dramatic increase in viscosity of a silica-$MgCl_2$ composition as the concentration of $MgCl_2$ increases, especially below 200 1/s (shear rate). Compared to existing conformance treatment technologies, a silica-$MgCl_2$ composition has much more flexibility in terms of injectivity due to shear thinning behavior and small size of nanoparticles (about 7 nm). It has much wider range of viscosity which can be easily controlled by the concentration of $MgCl_2$ and shear rates.

Figure 2:
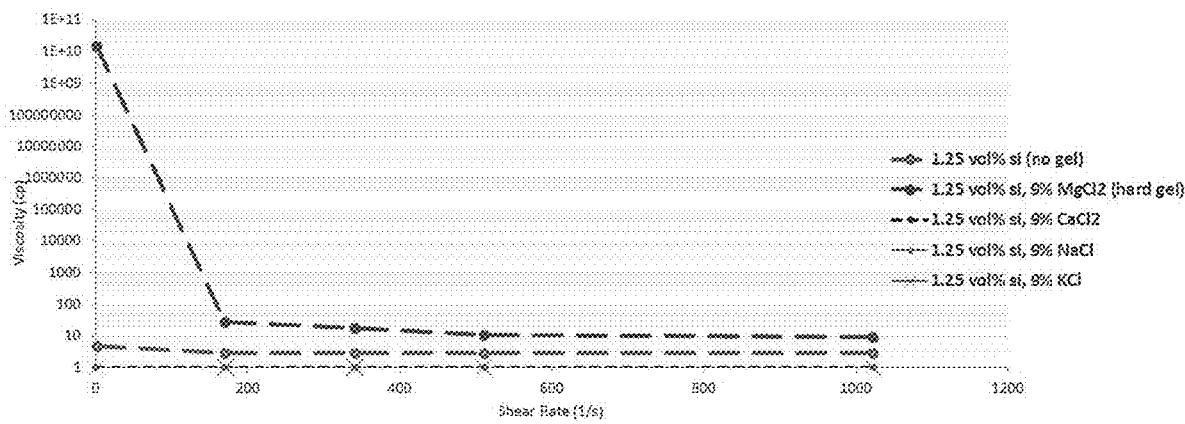
FIG. 2 shows viscosity of silica gel using different type of salts. 1.25 v % Si only (no gel), 1.25 v %+9 wt % $MgCl_2$ (hard gel), 1.25 v %+9 wt % $CaCl_2$ (no gel), 1.25 v %+9 wt % NaCl (no gel), 1.25 v %+9 wt % KCl (no gel).
Figure 3:
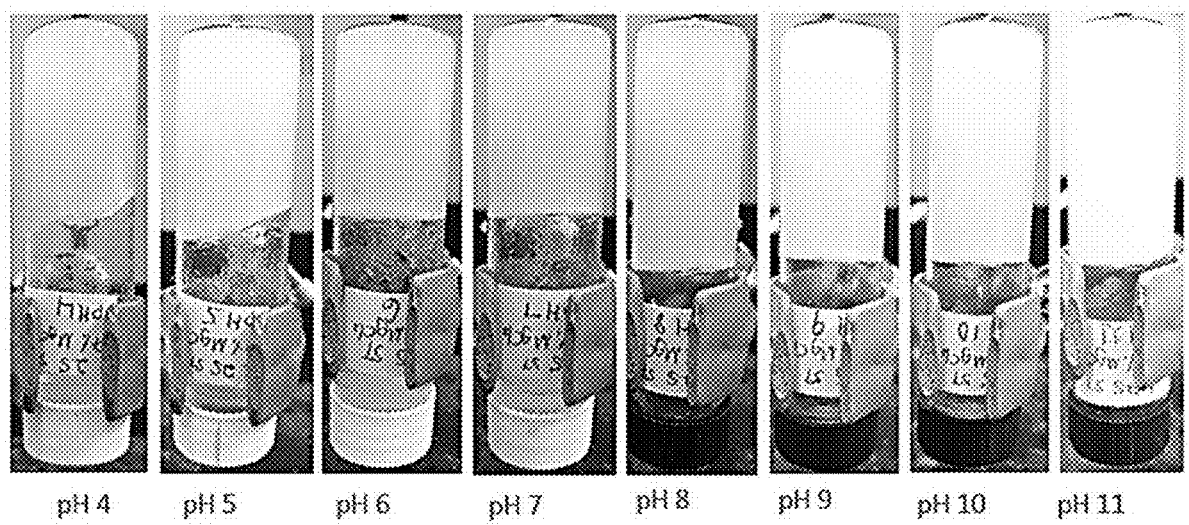
FIG. 3 shows gelation of 1.25 vol % Si+9 wt % $MgCl_2$ mixtures at different pH.

FIG. 2 indicates how effectively $MgCl_2$ increases viscosity compared to other types of salts. $MgCl_2$ outperforms over other salts ($10^{10}$ cp vs. 1-10 cp). This gel formulation requires small amount of fumed silica nanoparticles (1.25 vol % of silica is equal to 0.033 wt %). Thus, this in-situ gel is a cost-effective chemical conformance control technology with a wide range of viscosity flexibility to reduce unwanted fluid flow in large-opening features.

Example 4

Understanding the acid-base behavior of silica surfaces is important for the modification of silica nanoparticles. One of the most common interfacial chemical reactions is the deprotonation of silanol (SiOH) groups at water-silica interfaces. Deprotonation creates negative surface charges and in particular, structural details of deprotonated SiOH groups determine the binding of ions and molecules to immersed silica surfaces and the overall surface charge density. In this example, different types of monovalent and divalent cations were used to modify the silica surfaces and especially, magnesium ion was used as a crosslinking agent adsorbed on the surface of silica and create sticky spots. Gelation tables were created at different temperatures and salt concentrations to examine the effects of the ions to modify the silica surfaces. The system with the lowest critical gelation concentration and the fastest gelation rate was selected for further investigation.

Effects of Concentration and Temperature on Gelation

Silica nanoparticles were mixed with different type salts such as $MgCl_2$, $CaCl_2$, NaCl, and KCl. The concentration of silica nanoparticles and salts were varied in each mixture and compared at room temperature (about 23° C.) and 90° C. The gelation tables (Tables 1-8) illustrate how the gelation of the mixtures differ according to the concentration of silica with respect to the concentration of different salts at the two temperatures. Salt percentages are wt %.

TABLE 1

Gelation of silica and $MgCl_2$ mixtures at room temperature.

|  | Si 0.5 vol % | Si 0.75 vol % | Si 1 vol % | Si 1.25 vol % |
|---|---|---|---|---|
| $MgCl_2$ 1% | X | X | X | X |
| $MgCl_2$ 3% | X | X | X | X |
| $MgCl_2$ 5% | X | X | X | ○ |
| $MgCl_2$ 7% | X | ○ | ○ | ○ |
| $MgCl_2$ 9% | X | ○ | ○ | ○ |

X = no gel formation, and ○ = instant gel formation.

TABLE 2

Gelation of silica and $CaCl_2$ mixtures at room temperature.

|  | Si 0.5 vol % | Si 0.75 vol % | Si 1 vol % | Si 1.25 vol % |
|---|---|---|---|---|
| $CaCl_2$ 1% | Δ | Δ | Δ | Δ |
| $CaCl_2$ 3% | Δ | Δ | Δ | Δ |
| $CaCl_2$ 5% | Δ | Δ | Δ | Δ |
| $CaCl_2$ 7% | Δ | Δ | Δ | Δ |
| $CaCl_2$ 9% | Δ | Δ | Δ | Δ |

Δ = gel formed after 24 hours.

TABLE 3

Gelation of silica and NaCl mixtures at room temperature.

|  | Si 0.5 vol % | Si 0.75 vol % | Si 1 vol % | Si 1.25 vol % |
|---|---|---|---|---|
| NaCl 4% | X | X | Δ | Δ |
| NaCl 8% | X | X | Δ | Δ |
| NaCl 12% | X | X | Δ | Δ |
| NaCl 16% | X | Δ | Δ | Δ |
| NaCl 20% | X | Δ | Δ | Δ |
| NaCl 24% | X | Δ | Δ | Δ |

X = no gel formation, Δ = gel formed after 24 hours.

TABLE 4

Gelation of silica and KCl mixtures at room temperature.

|  | Si 0.5 vol % | Si 0.75 vol % | Si 1 vol % | Si 1.25 vol % |
|---|---|---|---|---|
| KCl 4% | X | X | X | Δ |
| KCl 8% | X | Δ | X | Δ |
| KCl 12% | X | Δ | Δ | Δ |
| KCl 16% | X | Δ | Δ | Δ |
| KCl 20% | X | Δ | Δ | Δ |
| KCl 24% | X | X | Δ | Δ |

X = no gel formation, Δ = gel formed after 24 hours.

For example, 0.75 vol % Si and 7 wt % $MgCl_2$ is needed to form an instant gel at room temperature as shown in Table 1. Higher concentrations of Si and $MgCl_2$ helps to form an instant gel. Magnesium ions can effectively bridge between particles, creating large network-like structures. After 24 hours of retention time period, $CaCl_2$, KCl, and NaCl can also from gelation and $CaCl_2$ is more effective to form gelation due to higher charge density in calcium ions than potassium and sodium. However, higher concentration of Si and salts can facilitate to form gel in overall.

TABLE 5

Gelation of silica and $MgCl_2$ mixtures at 90° C.

|  | Si 0.5 vol % | Si 0.75 vol % | Si 1 vol % | Si 1.25 vol % |
|---|---|---|---|---|
| $MgCl_2$ 1% | Δ | Δ | Δ | Δ |
| $MgCl_2$ 3% | Δ | Δ | Δ | Δ |
| $MgCl_2$ 5% | Δ | Δ | Δ | ○ |
| $MgCl_2$ 7% | Δ | ○ | ○ | ○ |
| $MgCl_2$ 9% | Δ | ○ | ○ | ○ |

○ = instant gel formation,
Δ = gel formation after 5-7 hr

TABLE 6

Gelation of silica and $CaCl_2$ mixtures at 90° C.

|  | Si 0.5 vol % | Si 0.75 vol % | Si 1 vol % | Si 1.25 vol % |
|---|---|---|---|---|
| $CaCl_2$ 1% | Δ | Δ | Δ | Δ |
| $CaCl_2$ 3% | Δ | Δ | Δ | Δ |

TABLE 6-continued

Gelation of silica and CaCl$_2$ mixtures at 90° C.

| | Si 0.5 vol % | Si 0.75 vol % | Si 1 vol % | Si 1.25 vol % |
|---|---|---|---|---|
| CaCl$_2$ 5% | Δ | Δ | Δ | Δ |
| CaCl$_2$ 7% | Δ | Δ | Δ | Δ |
| CaCl$_2$ 9% | Δ | Δ | Δ | Δ |

Δ = gel formation after 5-7 hr

TABLE 7

Gelation of silica and NaCl mixtures at 90° C.

| | Si 0.5 vol % | Si 0.75 vol % | Si 1 vol % | Si 1.25 vol % |
|---|---|---|---|---|
| NaCl 4% | Δ | Δ | Δ | Δ |
| NaCl 8% | Δ | Δ | Δ | Δ |
| NaCl 12% | Δ | Δ | Δ | Δ |
| NaCl 16% | Δ | Δ | Δ | Δ |
| NaCl 20% | Δ | Δ | Δ | Δ |
| NaCl 24% | Δ | Δ | Δ | Δ |

Δ = gel formation after 5-7 hr

TABLE 8

Gelation of silica and KCl mixtures at 90° C.

| | Si 0.5 vol % | Si 0.75 vol % | Si 1 vol % | Si 1.25 vol % |
|---|---|---|---|---|
| KCl 4% | Δ | Δ | Δ | Δ |
| KCl 8% | Δ | Δ | Δ | Δ |
| KCl 12% | Δ | Δ | Δ | Δ |
| KCl 16% | Δ | Δ | Δ | Δ |
| KCl 20% | Δ | Δ | Δ | Δ |
| KCl 24% | X | Δ | Δ | Δ |

X = no gel formation,
Δ = gel formation after 5-7 hr

In Table 5, 0.75 vol % Si and 7 wt % MgCl$_2$ formulation still forms an instant gel at 90° C. and all of the other formulations create gelation after 5 to 7 hours (Tables 6-8). This data shows that high temperature dominates phase behavior over the concentrations of silica nanoparticles and salts. However, the trend with higher concentration of Si and MgCl$_2$ forming an instant gel still remains. High temperature may work better to form gelation due to the destruction of natural hydrogen bonded network of water which is favorable for both mono and divalent cations to be adsorbed on the silica surface and help to build gel networks.

Effect of pH on Gelation

The acidities of surface silanol groups are assigned to different chemical connectivities or inter-silanol hydrogen bonding. It is the "temporary structure" of the agglomerates and can be accounted by the breaking of hydrogen bridge linkages. As pH increases, more silanol groups are deprotonated and silica surfaces become more negatively charged. Since these negatively charged surfaces can react with cations and facilitate gelation.

In Table 9, 1.25 vol % Si+9% MgCl$_2$ forms gelation between pH 3 and pH 11. This indicates that MgCl$_2$ performs much better than 9% NaCl and 9% CaCl$_2$ due to higher charge density with more deprotonated silanol groups on the surfaces at higher pH. Soft gel with 1.25 vol % Si+9% MgCl$_2$ formulation was also formed at pH 3. However, hard gel was formed between pH 4 and pH 11 as shown. Soft gel was defined as the gelation with influence by gravity. In other words, soft gel will fall when the test vial is flipped upside down whereas hard gel has no impact by the gravity. Usually, hard gel stays on the bottom of the test vial for weeks when it is flipped upside down.

TABLE 9

Sensitivity of gelation of mixtures of various salts with 1.25 vol % Si according to pH

| pH | 9% NaCl | 9% MgCl$_2$ | 9% CaCl$_2$ |
|---|---|---|---|
| 1 | X | X | X |
| 2 | X | X | X |
| 3 | X | soft gel | X |
| 4 | X | Gel | X |
| 5 | X | Gel | X |
| 6 | X | Gel | X |
| 7 | X | Gel | X |
| 8 | X | Gel | X |
| 9 | X | Gel | X |
| 10 | soft gel | Gel | soft gel |
| 11 | soft gel | Gel | soft gel |

Zeta Potential and Mean Aggregate Size

Figure 4:
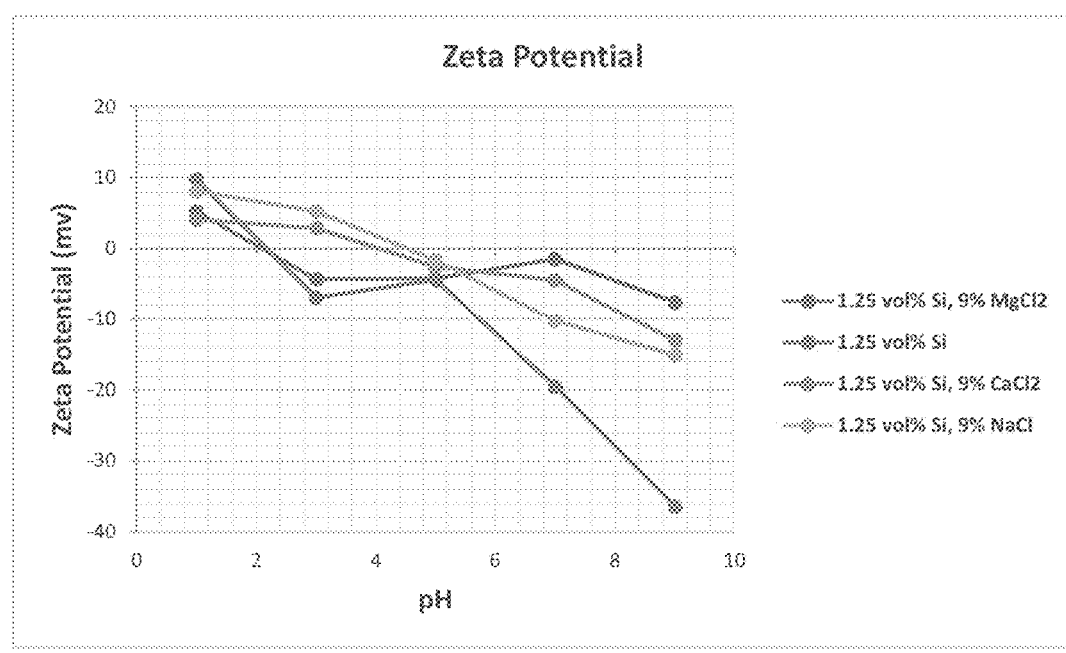
FIG. 4 shows Zeta potentials of several silica and salt mixtures at different pH.
Figure 5:
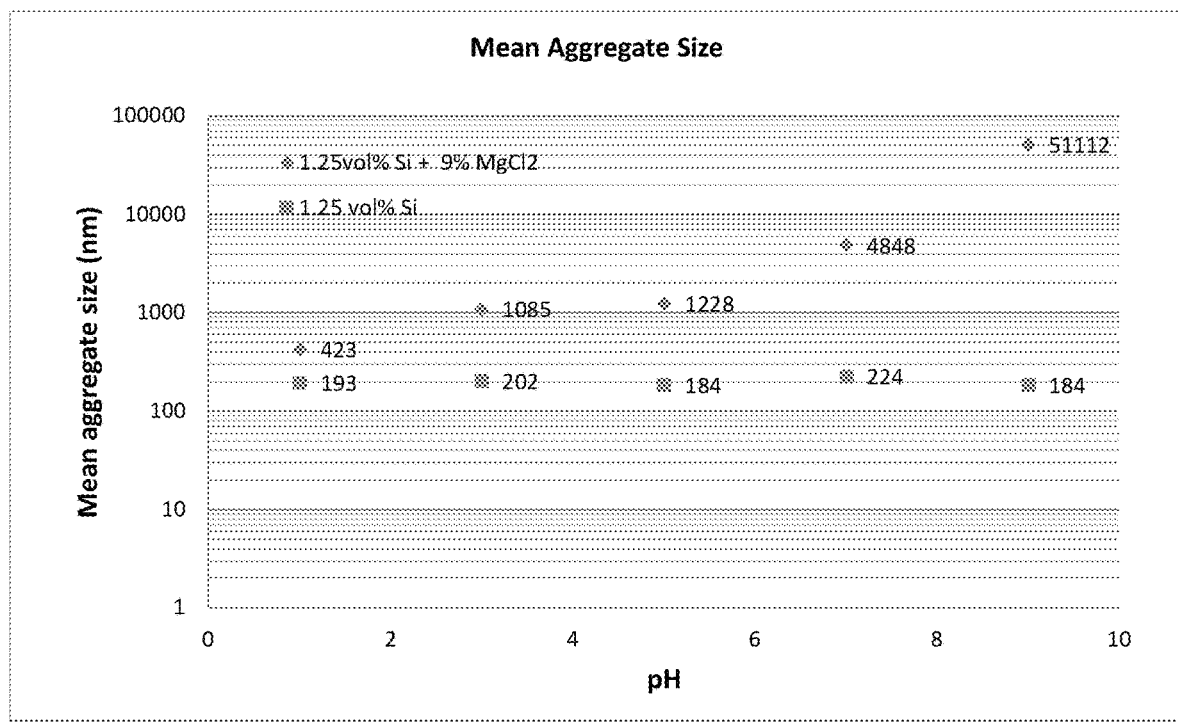
FIG. 5 shows the effect of $MgCl_2$ on mean aggregate size of silica at different pH.

Zeta potential data supports the previous pH sensitivity analysis on gelation region. In FIG. 4, overall trend is that zeta potential become more negative due to the deprotonation. However, silica with salts show that zeta potential is less negative or closer to zero. In other words, salts compress the diffuse layer of the particles and become less stable. This instability introduces more aggregation of silica nanoparticles and 1.25 vol % Si+9 wt % MgCl$_2$ shows the absolute values of zeta potential get smaller (<10 my) in the gelation region between pH 3 and pH 9. Also, mean aggregate size was measured by ZetaPals (Brookheaven) as shown in FIG. 5. The results clearly indicate that the mean aggregate size is much bigger in the gelation region with the surface modification by MgCl$_2$.

Rheology Studies (Effects of Shear Rates, Concentration of Si and Salts)

The process of gelation is still not well known. The formation of such oxide gels occurs through hydrolysis and polycondensation which are extremely complex having a rate constant depending drastically on the pH, composition, and temperature of the sols. The rheology of silica gel prepared from mixtures of silicon oxide-MgCl$_2$-water varying shear rates, concentration of silicon oxide and MgCl$_2$ was studied under basic neutral conditions at 25° C. during the gelation process. The gelation shows non-Newtonian pseudoplastic behavior from the time of preparation near the gelation point.

A torsional rheometer (SR5000 Rheometric Scientific) is used to measure the steady-shear and complex viscosity of nanofluid at low shear rates and Fann viscometer is used for high shear rates due to its instability during the tests in the torsional rheometer with small sample size. Fann viscometer is known as the Standard of the Industry for drilling fluid viscosity measurements. The test sample is contained in an annular space or shear gap between the cylinders and Fann produces a range of true Couette coaxial cylinder rotational viscometers. Through precision gearing, it operates the rotation of the outer cylinder with known velocities and the viscous drag exerted by the fluid creates a torque on the inner cylinder or bob. This torque is transmitted to a precision spring and its deflection is measured.

Figure 6:
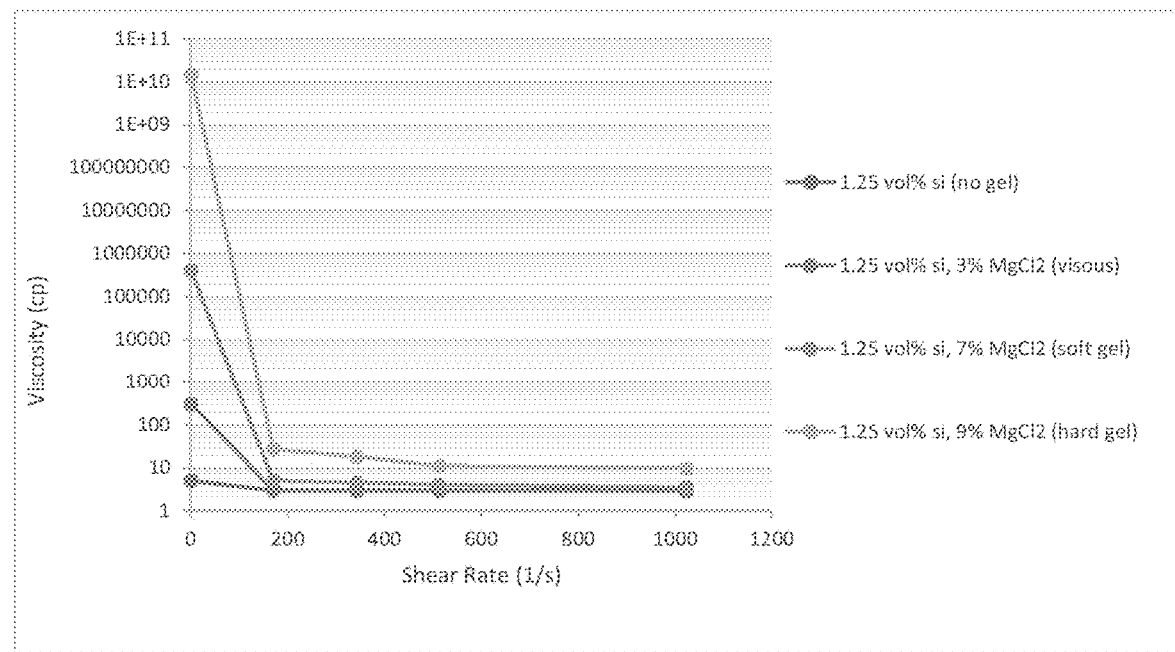
FIG. 6 shows a shear rate vs viscosity comparison of 1.25 vol % silica in mixtures with different concentration of $MgCl_2$.

The viscosity of silica gel was compared at 0.75/1/1.25 vol % Si+0/3/5/7/9 wt % MgCl$_2$ at different shear rates. FIG. 6 clearly present a different degree of shear thinning behavior throughout all samples. However, 1.25 vol % Si+9 wt % MgCl$_2$ sample shows the most drastic decrease in viscosity as shear rate increases. Table 10 defines different viscosity regimes such as viscous, soft gel, hard gel, and no gel. No gel region is defined with viscosity less than 10 cp. Viscous region is defined with viscosity between $10^2$ cp and $10^3$ cp. Soft gel region is defined with viscosity between $10^4$ cp and $10^9$ cp. Lastly, hard gel region is defined with viscosity between $10^{10}$ cp and $10^{13}$ cp.

TABLE 10

Gelation table with Si + $MgCl_2$

|  | Si 0.5 vol % | Si 0.75 vol % | Si 1 vol % | Si 1.25 vol % |
|---|---|---|---|---|
| $MgCl_2$ 1% | X | X | X | X |
| $MgCl_2$ 3% | X | X | X | V |
| $MgCl_2$ 5% | X | V | V | S |
| $MgCl_2$ 7% | X | S | S | S |
| $MgCl_2$ 9% | X | O | O | O |

X: no gel (<10 cp),
V: viscous ($10^{2-3}$ cp),
S: soft gel ($10^{4-9}$ cp),
O: hard gel ($10^{10-13}$ cp).

Figure 7:
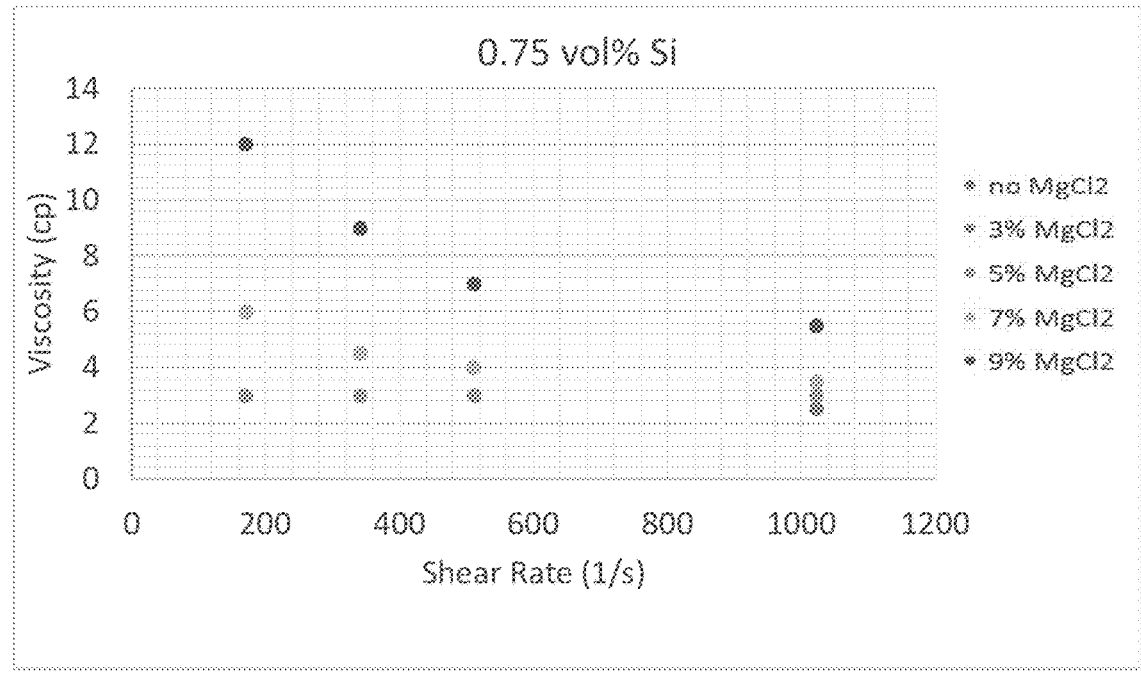
FIG. 7 shows a shear rate vs viscosity comparison of 0.75 vol % silica in mixtures with different concentrations of $MgCl_2$.
Figure 8:
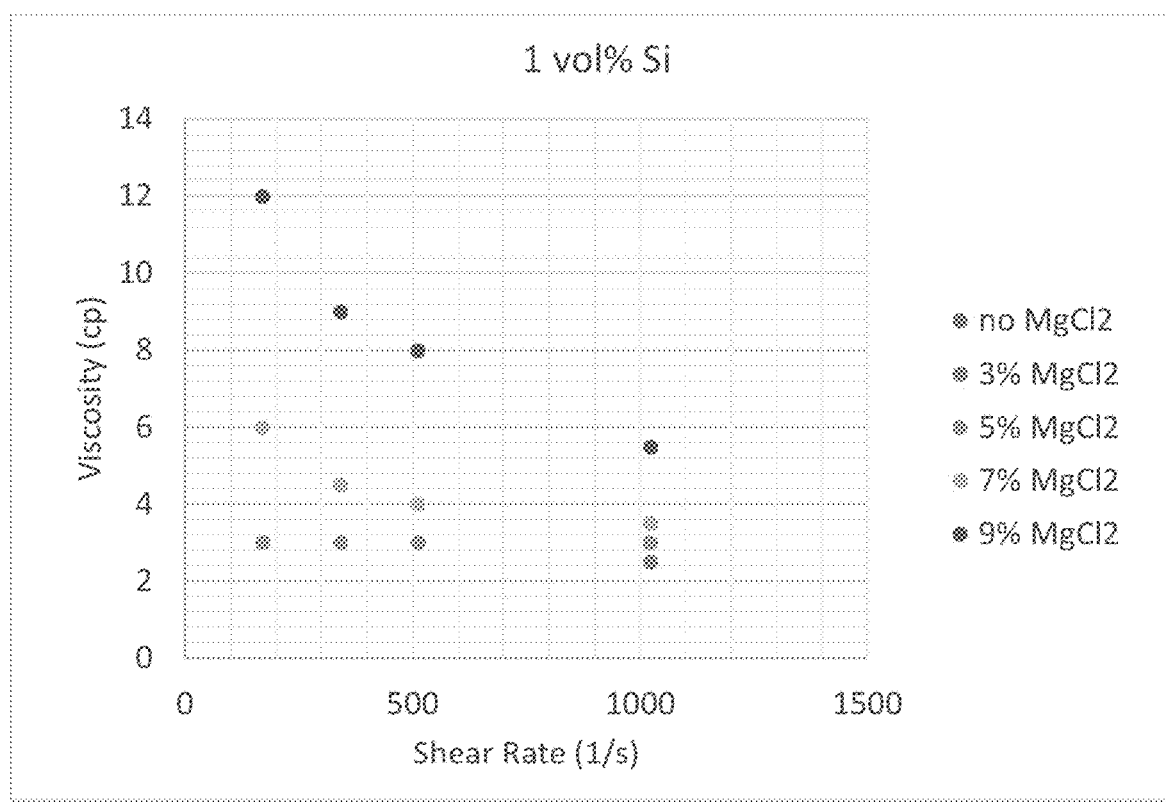
FIG. 8 shows a shear rate vs viscosity comparison of 1.0 vol % silica in mixtures with different concentration of $MgCl_2$.
Figure 9:
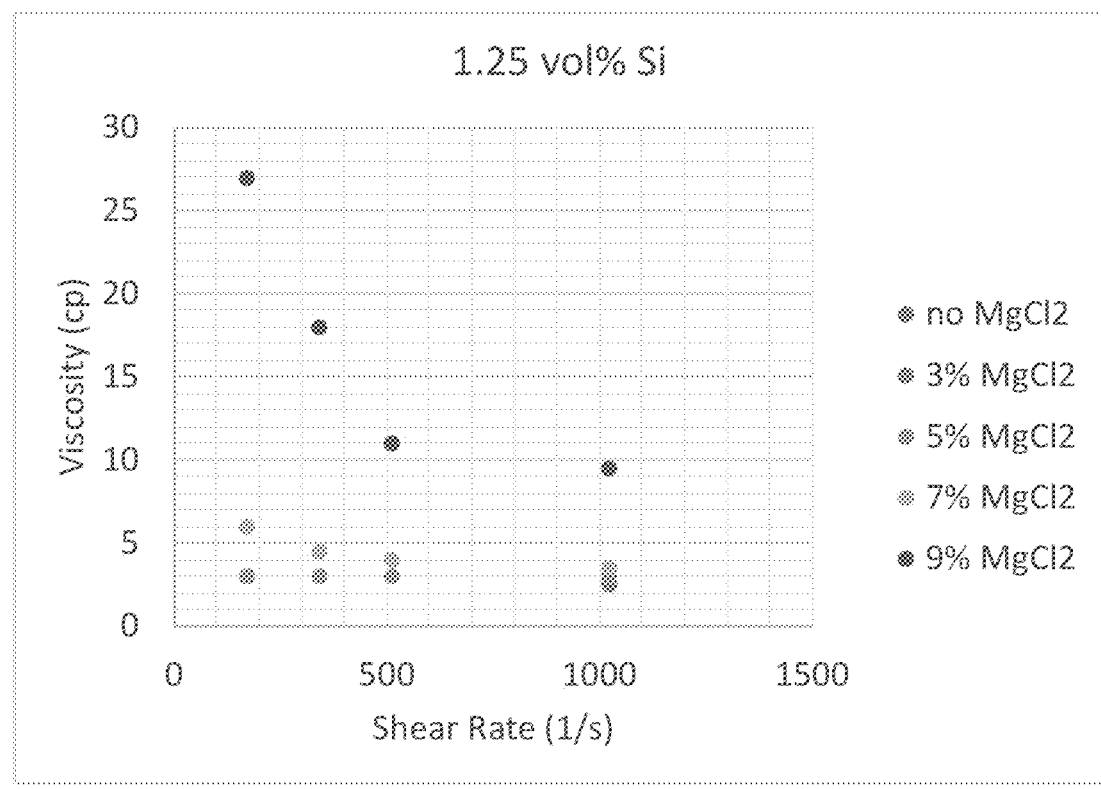
FIG. 9 shows a shear rate vs viscosity comparison of 1.25 vol % silica in mixtures with different concentration of $MgCl_2$.
Figure 10:
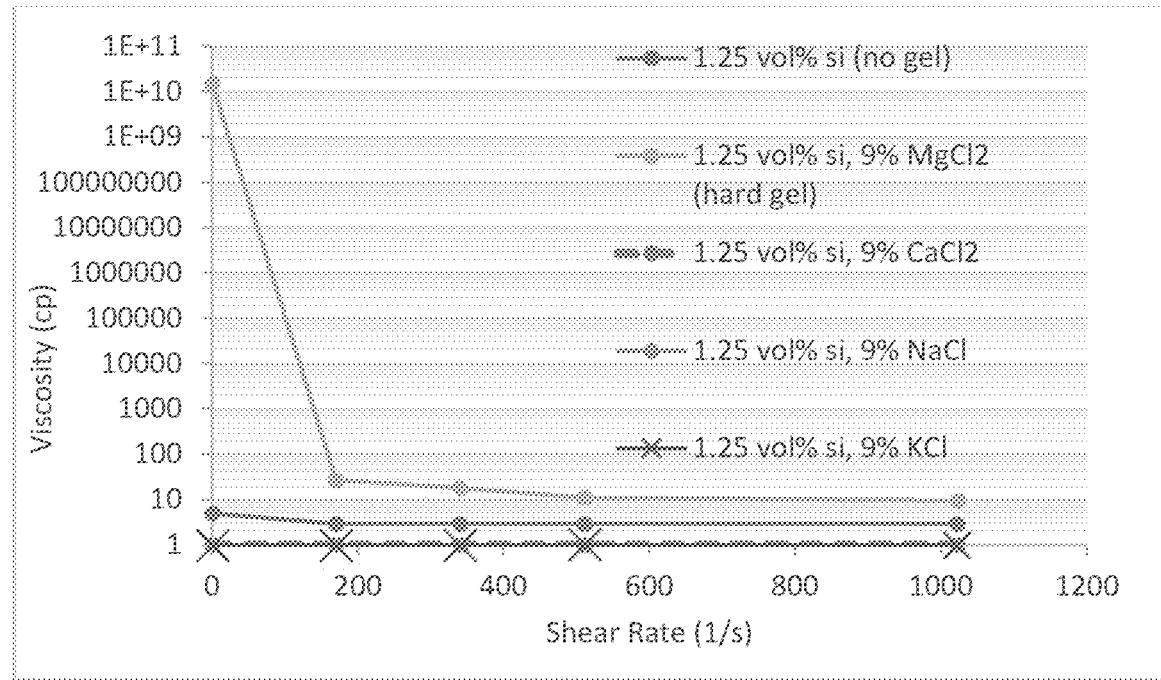
FIG. 10 shows a shear rate vs viscosity comparison of 1.25 vol % silica in mixtures with different salts.

In FIG. 7, initial viscosity increases are observed 7% $MgCl_2$. For example, 0.75 vol % Si shows 3 cp up to 5 wt % $MgCl_2$ and majority of data are overlapped. However, 0.75 vol % Si+7 wt % $MgCl_2$ starts showing deviation in viscosity which is two time higher than 0.75 vol % Si+5 wt % $MgCl_2$ sample. This similar trend is also observed in FIGS. 8-9. The outstanding performance of $MgCl_2$ in terms of boosting viscosity is also confirmed in a comparison with $CaCl_2$, NaCl, and KCl in FIG. 10. The viscosity is lower when $CaCl_2$, NaCl, and KCl are present in the solution compared with a sample with no salt added and there is no reasonable explanation found yet. Another general trend is that increase in silica concentration also boost the viscosity.

Breaking Gelation

Figure 11:
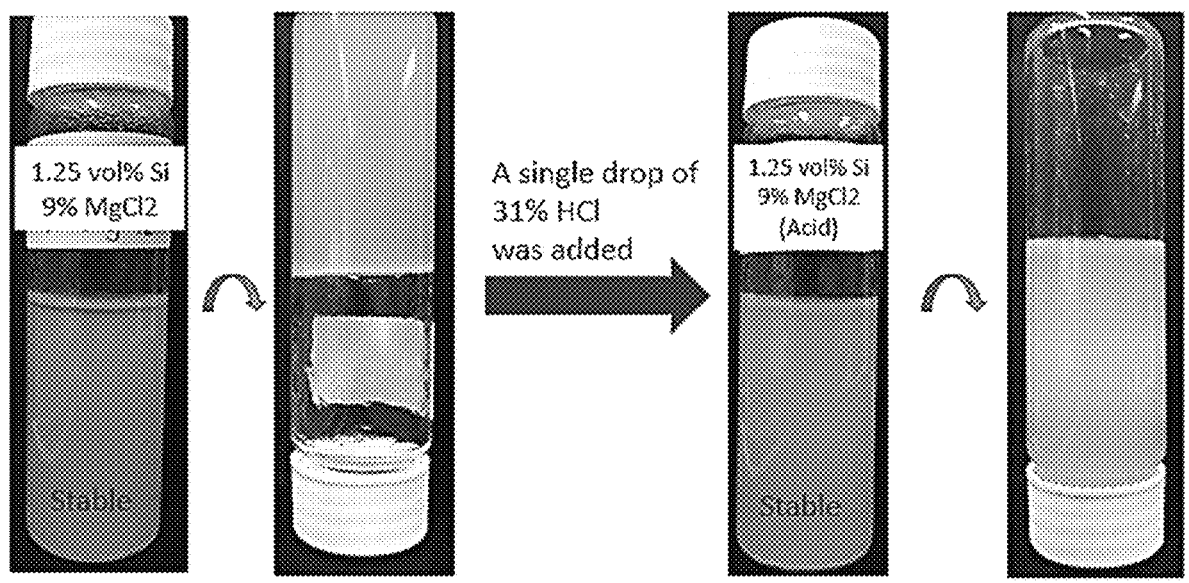
FIG. 11 shows the breaking effect of HCl acid on the gel state of 1.25 vol % silica/$MgCl_2$ mixture.

Once the nanofluid is injected into the targeted zone, gel is not wanted after the acid diversion. Thus, acid diversion is not only important, but also breaking gel is necessary in order to avoid permanent pore blocking or formation damage. There are three effective ways to break gelation. (1) Low pH (<pH 2) can break the gel by protonation on the surface silanol groups. Hydrogen bridging is no longer effective at the low pH 2. (2) Applying shear rates into the gel, can break hard aggregates to soft aggregates. Some of the weakly bonded network can be broken apart and the viscosity dramatically decreases. (3) Reducing the concentration of silica can decrease the viscosity. The dilution of silica can minimize the amount of hard aggregates and make the system below critical gelation concentration. These three methods are very effective and laboratory experiments were performed as shown in FIG. 11.

Figure 12:
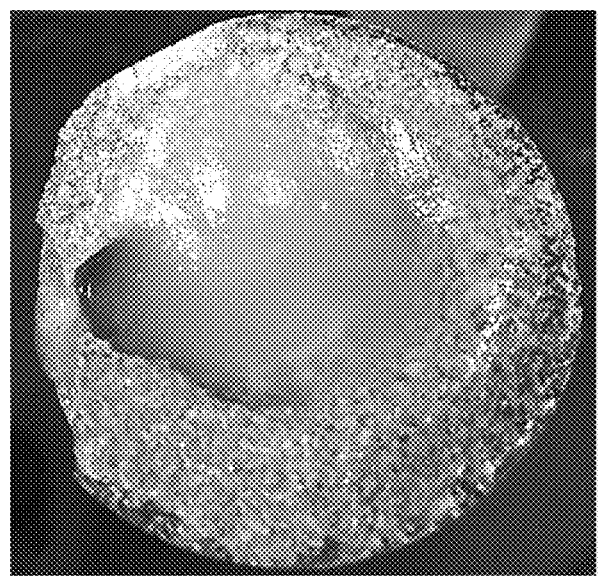
FIG. 12 shows gelation of a silica/$MgCl_2$ mixture in a core.
Figure 13:
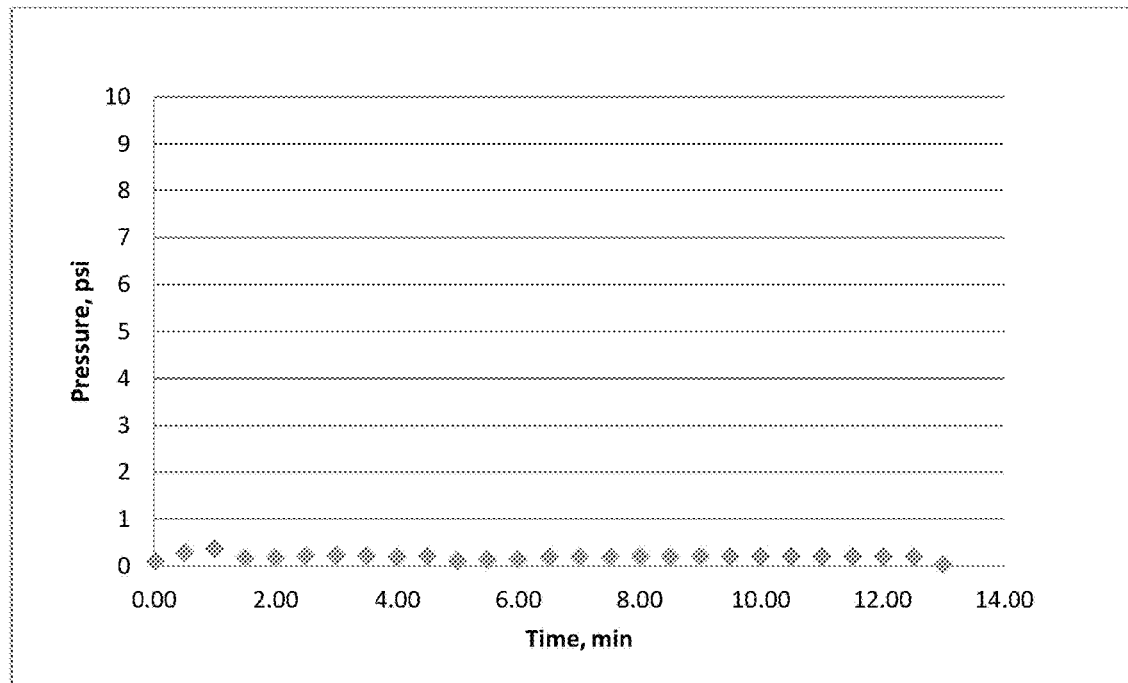
FIG. 13 shows time vs differential pressure through Indiana limestone core during a gel breaking test.

FIG. 12 shows the presence of gelation in the wormhole of Indiana limestone core and it is put into a core holder and water was injected with 1 ml/min at 90° C. The core was selected with a pre-existing wormhole and fully immersed in the nanofluid (1.25 vol % Si+9 wt % $MgCl_2$) for 24 hours in order to make gelation in the wormhole. Instant gel breaking was confirmed with water breakthrough in a few minutes and differential pressure less than 1 psi (FIG. 13).

In conclusion, (1) 7 wt % $MgCl_2$ can effectively form an instant gel with 0.75 vol % Si and high temperature can minimize gelation time, (2) there is an optimum pH region for gelation due to its change in surface property by proto-nation at low pH and deprotonation at high pH, (3) zeta potential shows that $MgCl_2$ can modify overall surface charge on silica, (4) mean aggregate size significantly increases with increasing in pH since there are more negatively charged silanol group sites to react with $Mg^{2+}$ ions, and (5) rheology data indicate that it is a shear thinning fluid. Thus, viscosity can be easily controlled by shear rates. Shear force, dilution of silica nanoparticles, and low pH (<pH 2) can break gelation.

Example 5

Diversion Using Nanoparticle-Based In-Situ Gelled Acids Systems

Sandpack Test

One dimensional column tests were used in this study to simulate one-dimensional flow through crushed Indiana limestone. Valuable information obtained from the column study include: gelation enhancement under flow-through conditions, potential plugging in the formation by the gelation. The procedures for setting up a column are briefly described below. Indiana limestone was gently crushed and sieved through sieving trays to get a specific grain size. Permeability of 3 inch long and 1 inch in diameter sandpack was measured base on the stable differential pressure of the sandpack column once it reaches steady state during flow tests with various flow rates. 9% $MgCl_2$ was used to pre/post flush the column and different injection strategies such as flow rates, concentrations of silica or the presence of $MgCl_2$ were investigated to optimize the system to form gelation into the column. Before the injection of nanofluid, pH of nanofluid was adjusted by citric acid which is a weak acid to make solution pH lower than 4. Thus, high viscous gel is not initially formed before the nanofluid injection. After the acid reaction between nanofluid+citric acid and Indiana limestone, pH increases due to the production of water from the reaction. This increase in pH induces nanofluid to move into gelation region.

Figure 14:
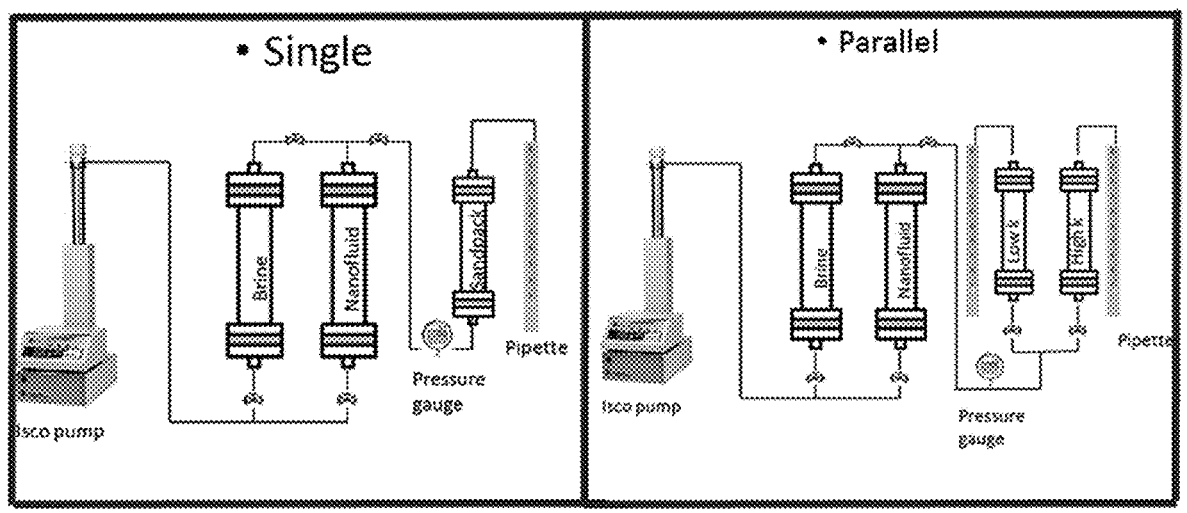
FIG. 14 is a schematic showing the sandpack test designs used herein.
Figure 15:
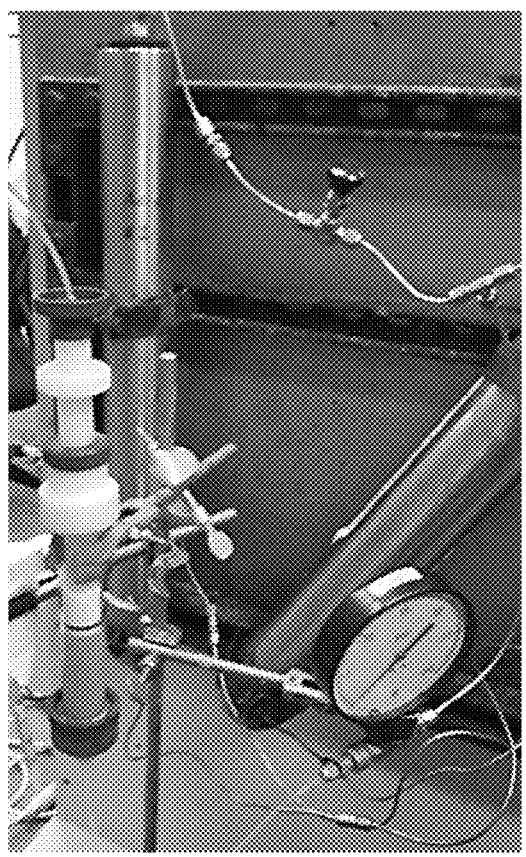
FIG. 15 is a photograph of an embodiment of a sandpack test apparatus used herein.

FIGS. 14-15 show the design of the single and parallel sandpack tests. In parallel sandpack tests, two different permeability sandpacks were prepared and nanofluid was co-injected into both columns to investigate flow pattern in the columns simultaneously. Isco pump was used in constant flow mode throughout the tests. Two separate accumulators were used for $MgCl_2$ and nanofluid. The recovery of silica nanoparticles was confirmed by UV-vis.

Table 11 shows the properties of porous media like porosity and permeability as well as test conditions such as flow rates, temperature, and different types of nanofluid. From test 1 to test 4, flow rate, temperature, permeability, and porosity were fixed and only nanofluid injection strategy was varied. For example, one pore volume of 1.25 vol % Si+9 wt % $MgCl_2$ and three pore volume of 0.5 vol % Si+9 wt % $MgCl_2$ plugged sandpack in test 2 and test 4. However, nanofluid without $MgCl_2$ did not plug the sandpack. This indicates that the presence of $MgCl_2$ is important in forming gelation into the porous media and it is an effective cross linker to build gel network.

TABLE 11

Sandpack tests with different nanofluid formulations

| | Test 1 | Test 2 | Test 3 | Test 4 |
|---|---|---|---|---|
| Premability | 200~300 md | 200~300 md | 200~300 md | 200~300 md |
| Porosity | 32% | 32% | 32% | 32% |
| Flow rate | 1 mL/min | 1 mL/min | 1 mL/min | 1 mL/min |
| Temperature | RT | RT | RT | RT |
| Pre/Post-flush | $MgCl_2$ | $MgCl_2$ | $MgCl_2$ | $MgCl_2$ |
| Nano-injection (with CA 0.05%) | 1PV of 1.25 vol % Si | 1PV of 1.25 vol % Si + $MgCl_2$ | 3PV of 0.5 vol % Si | 3PV of 0.5 vol % Si + $MgCl_2$ |
| Total Si recovery | 96% | N/A, Plugged | >100% | N/A, Plugged |
| Max. Injection Pressure | 2 psi | >25 psi | <1 psi | >25 psi |

In Table 12, three different shear rates were tested since our nanofluid is shear thinning fluid. The change in shear rates can introduce different range of viscosity. The hypothesis was that test 5 with the lower flow rate induce gelation more effectively due to the higher viscosity and may plug the sandpack. This can give a confidence for parallel coreflood tests since enough viscosity increase is needed for in-situ gelled acid to plug or slow down the flow instantly in the higher permeability core so that the following acid can injected into the lower permeability core.

TABLE 12

Sandpack tests with different flow rates (shear rates)

| | Test 5 | Test 6 | Test 7 |
|---|---|---|---|
| Premeability | 5 Darcy | 5 Darcy | 5 Darcy |
| Porosity | 34% | 34% | 34% |
| Flow rate | 0.1 mL/min | 0.5 mL/min | 1 mL/min |
| Temperature | RT | RT | RT |
| Pre/Post-flush | 9% $MgCl_2$ | 9% $MgCl_2$ | 9% $MgCl_2$ |
| Nano-injection (with CA 0.05%) | 1PV of 1.25 vol % Si + 9% $MgCl_2$ | 1PV of 1.25 vol % Si + 9% $MgCl_2$ | 3PV of 1.25 vol % Si + 9% $MgCl_2$ |
| Max. Injection Pressure | >25 psi (plugged) | 16.4 psi | 10 psi |

Figure 16:
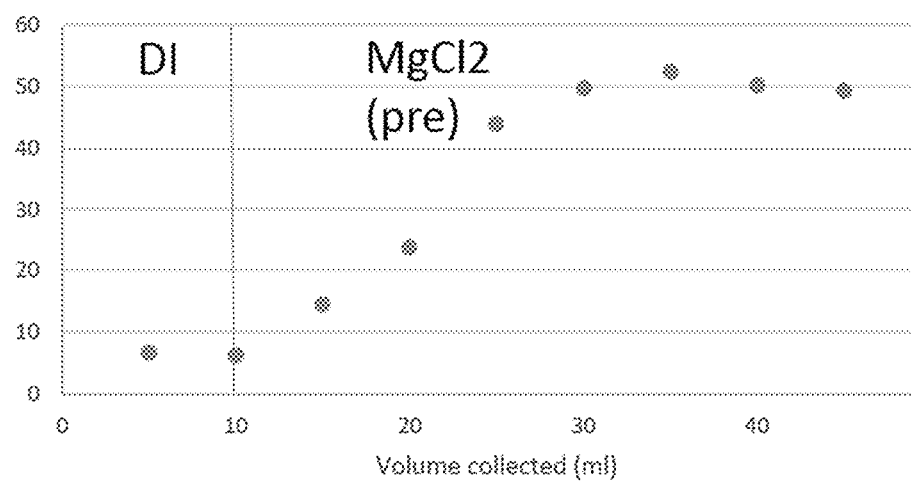
FIG. 16 shows conductivity measurements taken during Test 5.
Figure 17:
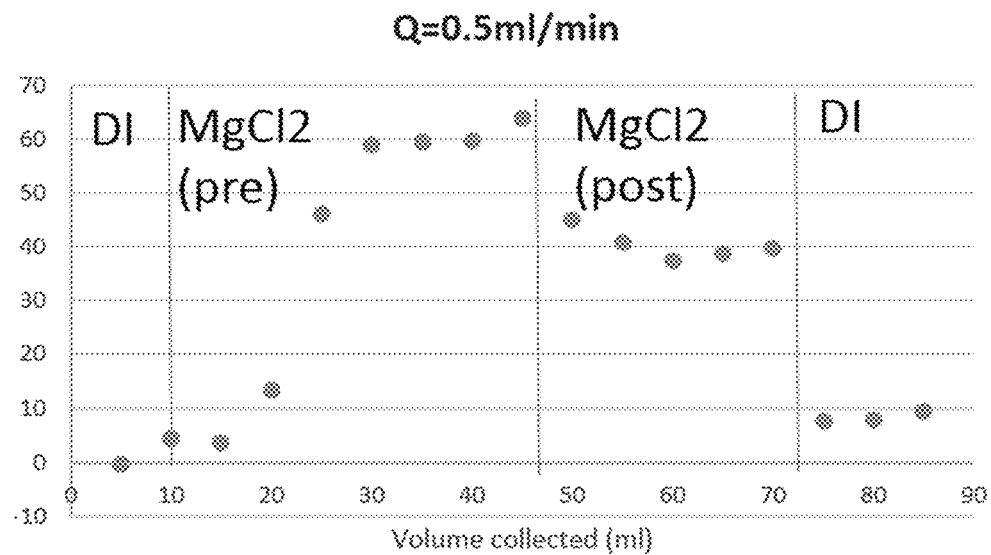
FIG. 17 shows conductivity measurements taken during Test 6.
Figure 18:
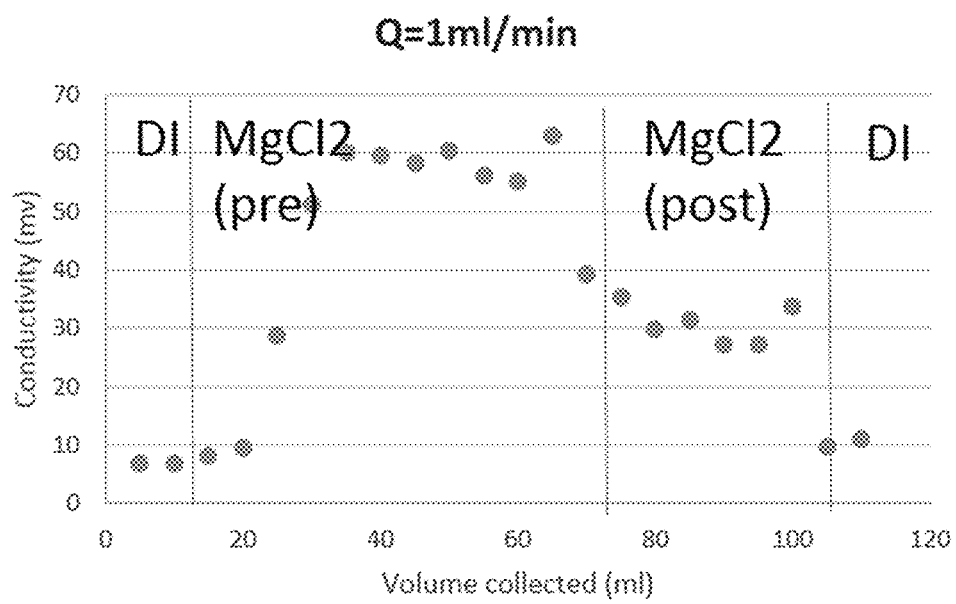
FIG. 18 shows conductivity measurements taken during Test 7.

In FIGS. 16-18, the conductivity measurements show the change in hydrodynamic before and after nanofluid injection. Since there is plugging in test 5, no conductivity measurements are available. However, it is clear that the formation was plugged and hydrodynamic changed completely because postflush with $MgCl_2$ was unable to perform due to plugging. FIGS. 17-18 show that there is no change in hydrodynamic before and after the nanofluid injection since conductivity values for pre and post flush with deionized water were not change much.

Parallel sandpack tests are used to give a credibility for parallel coreflood tests to divert acid into the lower permeability core. Thus, plugging in the high permeability sandpack is desired to confirm the in-situ gel mechanism. 3 inch long and 1 inch in diameter. Two sandpacks with 3 inch long and 1 inch in diameter were prepared and nanofluid was co-injected into both sandpacks simultaneously. Again, 9 wt % $MgCl_2$ was used to pre/post flush the column and before the injection of nanofluid, pH of nanofluid was adjusted by citric acid which is a weak acid to make solution pH lower than 4. During parallel sandpack tests, low permeability is 200 md and high permeability is about 3 Darcy.

Figure 19:
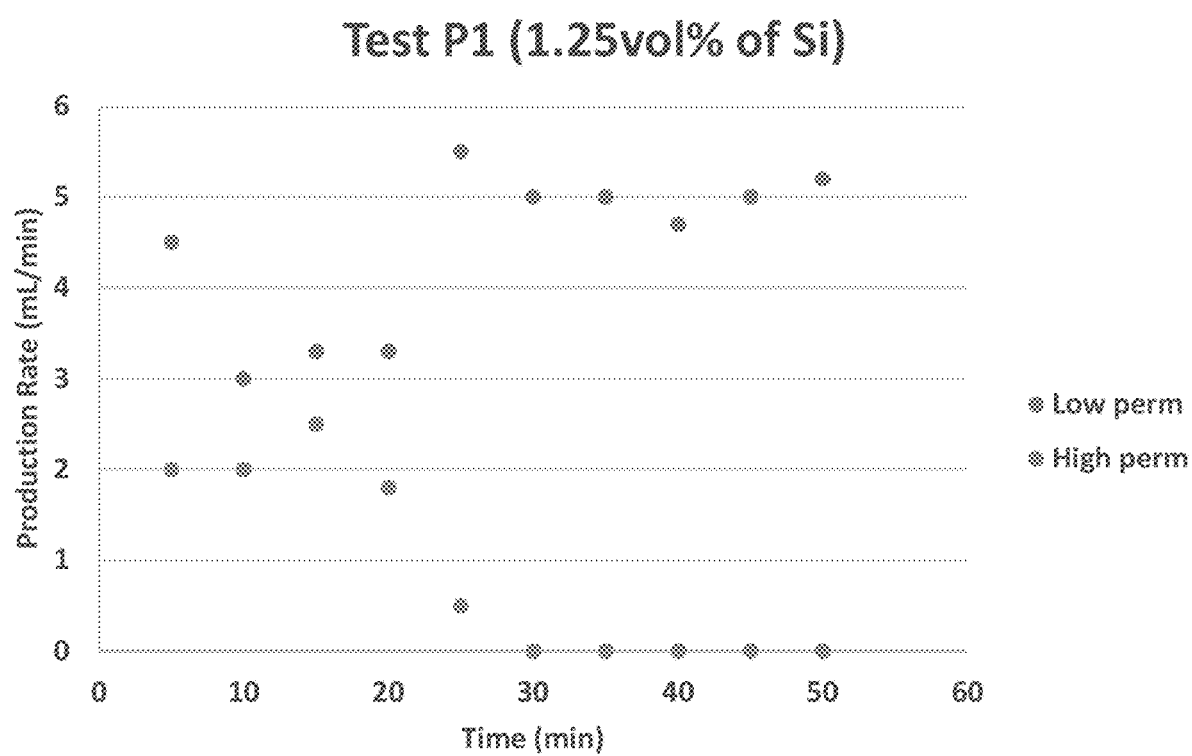
FIG. 19 shows a time vs production rate comparison between high and low perm sandpacks during Test P1.
Figure 20:
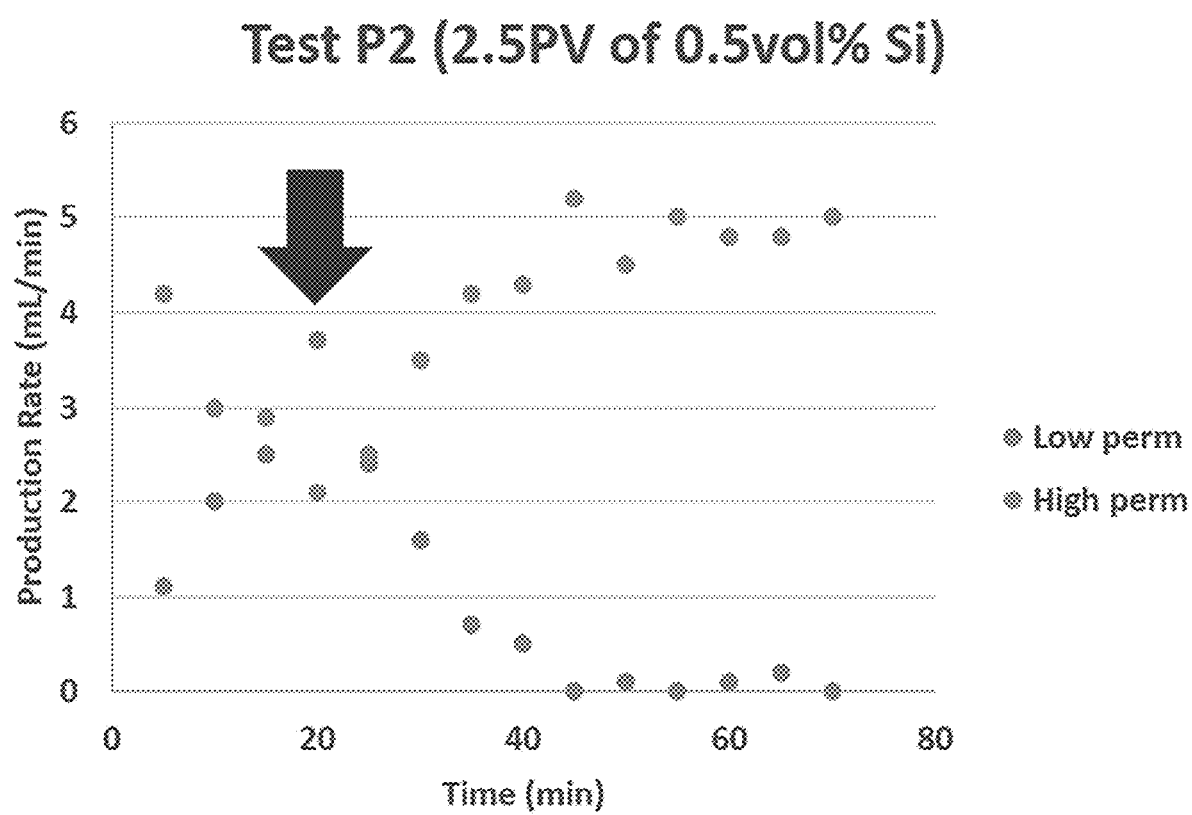
FIG. 20 shows a time vs production rate comparison between high and low perm sandpacks during Test P2.

Nanofluid used in P1 test is one pore volume of 1.25 vol % Si+9 wt % $MgCl_2$ and 2.5 pore volume of 0.5 vol % Si+9 wt % $MgCl_2$ was used for P2 test. P1 test shows plugging after 30 mins in FIG. 19 and there is a flip of production rate on P2 test at 20 mins in FIG. 20. This indicates that 1.25 vol % Si+9 wt % $MgCl_2$ system almost instantly slow down the flow in the high perm column and completely plugged the formation after 30 mins. However, and 2.5 pore volume injection of 0.5 vol % Si+9 wt % $MgCl_2$ was not enough to plug the high perm column. The flip of production rate on P2 test at 20 min can be a filtration effect on small pore throats but injection rate was high enough to apply enough shear forces to break big hard aggregates.

Coreflood Experiments for Diversion

This section discusses a new single stage stimulation fluid that is both self-diverting and deep penetrating in carbonate reservoirs. Surface modified silica form yield stress gels at a specific pH range, which helps to reduce injectivity into high permeability zone so that the acid can flow into the low permeability zone. The gel is an effective fluid-loss additive that optimizes acid dissolution of the carbamate to be more uniform and produce multiple deep penetrating wormholes. Single and parallel coreflood tests were implemented to study the flow of nanoparticle-based acids in porous media. The cores used in the experiments have the permeability range of 2 to 70 millidarcy (md).

Surface modified silica effectively form instant gels at volume fractions as low as 0.75% at neutral pH due to electrostatic heteroaggregation into networks. Higher concentration of silica and magnesium chloride exhibit stronger gel strength at room temperature and form gelation faster at a higher temperature.

The single coreflood results indicate that the nanoparticle-based acids create multiple wormhole paths for both low (2 md) and high (70 md) permeability cores and the acid is diverted into a low permeability core during parallel coreflood experiments. This stimulation fluid can divert the acid and generate multiple wormholes simultaneously in both low and high permeability cores.

TABLE 13

Single coreflood tests

| System | Test S1: 15% HCl | Test S2: 15% HCl | Test S3: 1.25 vol % Si + 15% HCl + 9% MgCl$_2$ | Test S1: 1.25 vol % Si + 15% HCl + 9% MgCl$_2$ | Test S1: 1.25 vol % Si + 15% HCl + 9% MgCl$_2$ | Test S1: 1.25 vol % Si + 15% HCl + 9% MgCl$_2$ | Test S1: 1.25 vol % Si + 15% HCl + 9% MgCl$_2$ |
|---|---|---|---|---|---|---|---|
| | | | Indiana Limestone | | | | |
| | Low k | High k | Low k | High k | Low k | High k | Field Core |
| Porosity | 15% | 15% | 15% | 15% | 15% | 15% | 13% |
| Permeability | 2 md | 70 md | 2 md | 70 md | 2 md | 70 md | <10 md |
| Temperature | 90° C. | 90° C. | 90° C. | 90° C. | Room Temperature | Room Temperature | 90° C. |
| Max Pump Pressure | 700 psi | 400 psi | 1600 psi | 2100 psi | 1260 psi | 1020 psi | 2200 psi (Pback = 1100 psi) |
| Flow rate | 3.5 ml/min | 3.5 ml/min | 3.5 ml/min | 3.5 ml/min | 3.5 ml/min | 3.5 ml/min | 3.5 ml/min |
| Acid Breakthrough | 4.5 mins | 8.3 mins | 20 mins | 12.8 mins | 16.2 mins | 12.5 mins | 8 mins |
| Length | 6 in | 6 in | 6 in | 6 in | 6 in | 6 in | 2.8 in |

The main objective of single coreflood tests is to confirm the propagation of nanofluid into both low and high permeability cores as well as field core. The variables through tests are permeability, temperature, and mineralogy of core. Table 13 shows that all tests have acid breakthrough which means both HCl (15 wt %) and nanofluid can be propagated into the cores. However, nanofluid tends to have slower acid breakthrough time since it is used as a retarded acid system creating in-situ gel. This also causes higher pressure environment.

Figure 21:
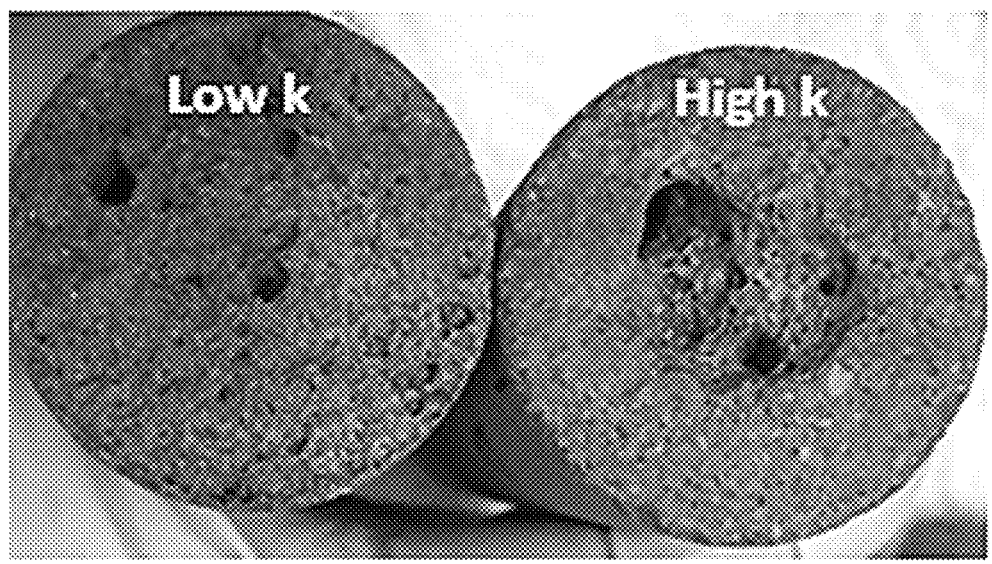
FIG. 21 shows photographs of the inlet (upper) and outlet (lower) ends of cores used in Test S1 and S2 with 15% HCl.
Figure 21:
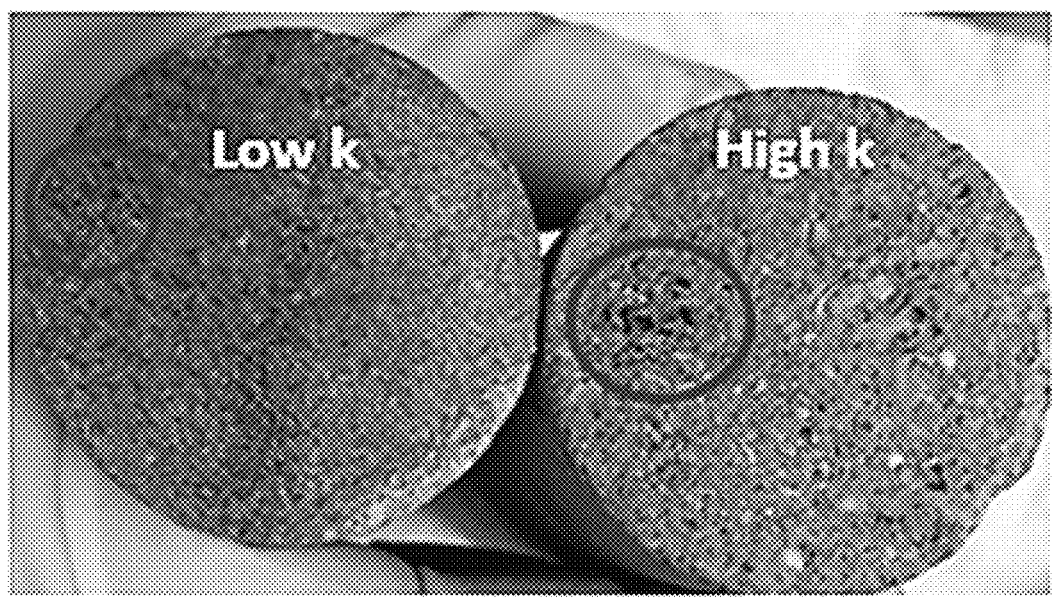
Figure 22:
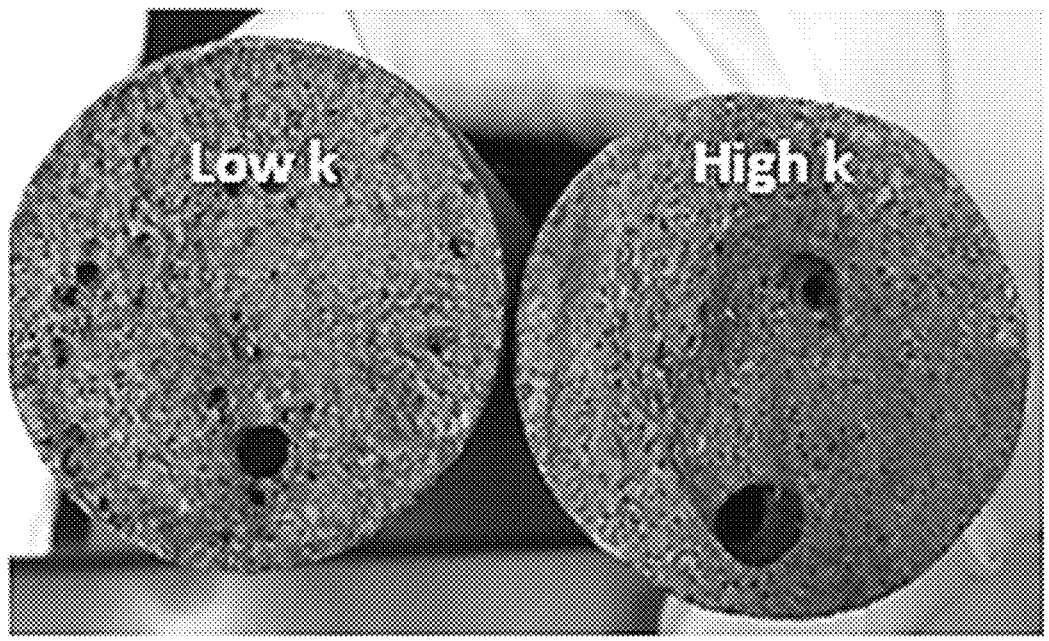
FIG. 22 shows photographs of the inlet (upper) and outlet (lower) ends of cores used in Test S3 and S4 with 1.25 vol % Si+9 wt % $MgCl_2$+15 wt % HCl.
Figure 22:
Figure 23:
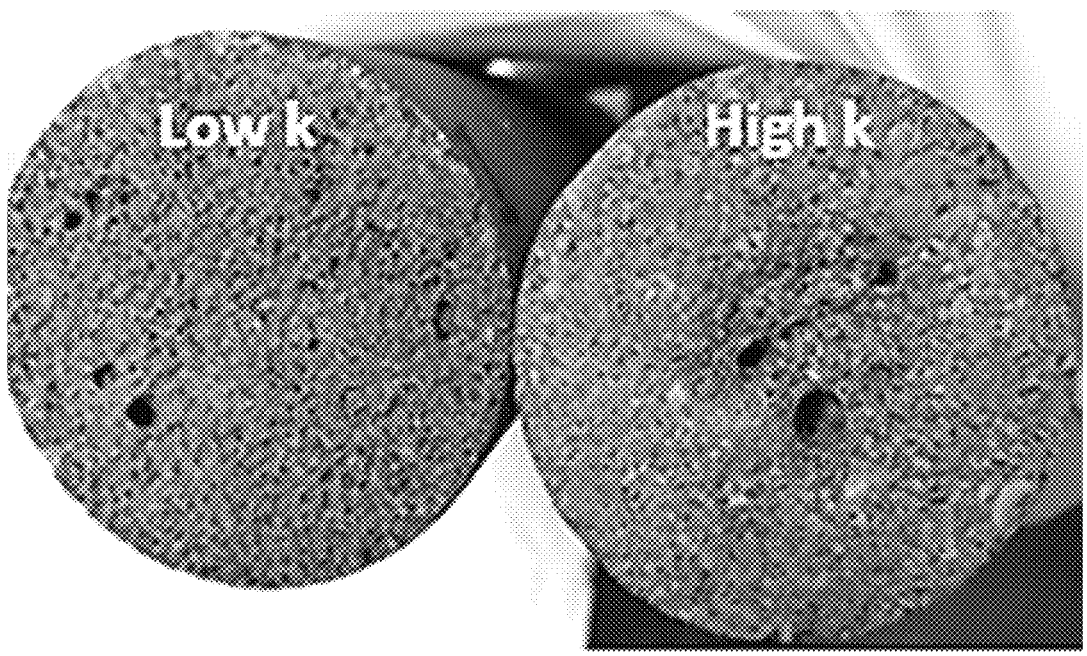
FIG. 23 shows photographs of the inlet (upper) and outlet (lower) ends of cores used in Test S5 and S6 with 1.25 vol % Si+9 wt % $MgCl_2$+15 wt % HCl.
Figure 23:
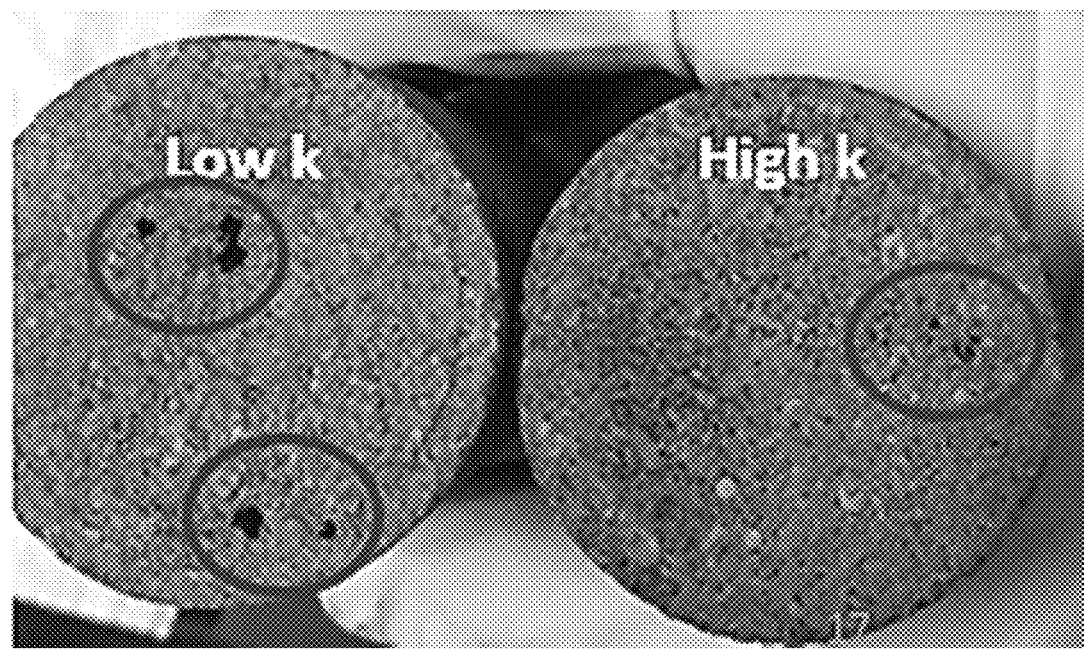

FIGS. 21-23 show that more numbers of wormhole were detected especially from the outlet of low perm cores in nanofluid injection and room temperature test has less face dissolution on the inlet surface. This concludes that test S5 is most successful run in terms of mild face dissolution and number of wormholes presented on the outlet of the core. However, parallel coreflood test is needed to confirm the effectiveness of diversion from high perm cores. These single coreflood tests indicate that nanofluid can be successfully propagated and it has tendency to have multiple wormholes due to its in-situ gel property.

Figure 24:
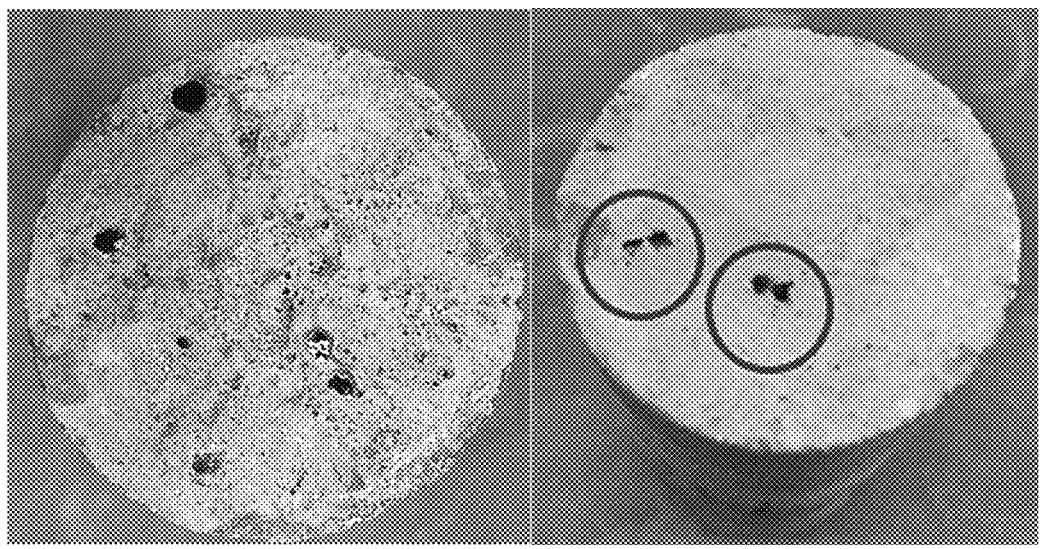
FIG. 24 shows photographs of the inlet (left) and outlet (right) ends of a core used in Test S7 with 1.25 vol % Si+9 wt % $MgCl_2$+15 wt % HCl.

The field core in test S7 has different mineralogy compared to Indiana limestone. It has significant portion of pyrite (10.5%), siderite (4.4%), Calcite (70%) as shown in Table 14 and chlorite (10.6%) whereas Indiana limestone cores contain 99.8% of calcite and 0.2% of quartz. The different mineralogy can introduce different degree of reaction rate between acid and rock or dissolution rate of rock (FIG. 24).

TABLE 14

Mineralogy of Field Core

| Quartz | Calcite (CaCO$_3$) | Chlorite (ClO$_2$-) | Pyrite (FeS$_2$) | Anhydrite (CaSO$_4$) | Siderite (FeCO$_3$) | Apatite (Ca$_5$(PO$_4$)$_3$(F,Cl,OH)) |
|---|---|---|---|---|---|---|
| 0.99 | 70.366 | 10.654 | 10.551 | 2.559 | 4.375 | 0.505 |

Figure 25:
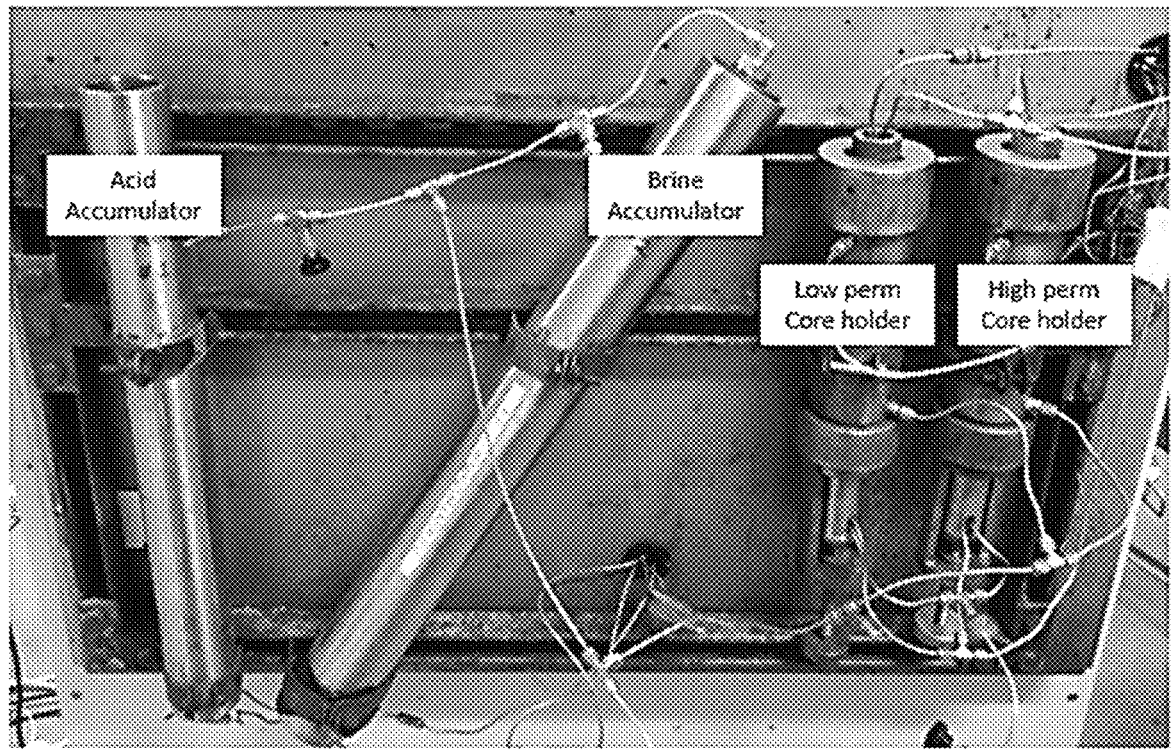
FIG. 25 is a photograph showing the apparatus used in the parallel coreflood tests of the present disclosure.

Parallel coreflood tests were implemented two different permeability cores (2 md vs. 70 md). The main objective of parallel coreflood tests is to confirm the diversion of acid into low permeability cores and create wormholes. The variables through tests are temperature, and type of injection fluid to compare the effectiveness of diversion. Flow rate, permeability, porosity is fixed. FIG. 25 shows the parallel coreflood apparatus and Table 15 shows that only test P3 with 1.25 vol % Si+9 wt % MgCl$_2$+15 wt % HCl has a successful diversion at 90° C.

TABLE 15

Single coreflood tests

| System | Test P1: 15% HCl Indiana Limestone | Test P2: 1.25 vol % Si + 15% HCl + 9% MgCl$_2$ Indiana Limestone | Test P2: 1.25 vol % Si + 15% HCl + 9% MgCl$_2$ Indiana Limestone |
|---|---|---|---|
| Porosity | 15% for both cores | 15% for both cores | 15% for both cores |
| Permeability | 2 md/70 md | 2 md/70 md | 2 md/70 md |
| Temperature | 90° C. | Room Temperature | 90° C. |

TABLE 15-continued

Single coreflood tests

| System | Test P1:<br>15% HCl<br>Indiana Limestone | Test P2:<br>1.25 vol % Si + 15% HCl +<br>9% MgCl$_2$<br>Indiana Limestone | Test P2:<br>1.25 vol % Si + 15% HCl +<br>9% MgCl$_2$<br>Indiana Limestone |
|---|---|---|---|
| Max Pump Pressure | 180 psi | 450 psi | 480 psi |
| Flow rate | 3.5 ml/min | 3.5 ml/min | 3.5 ml/min |
| Acid Breakthrough time | High perm : 8 mins<br>Low perm : N/A<br>"No Diversion" | Test was aborted after 50<br>mins of injection.<br>"No acid breakthrough" | High perm: 15 mins<br>Low perm: 20 mins<br>"Successful Diversion" |

Figure 26:
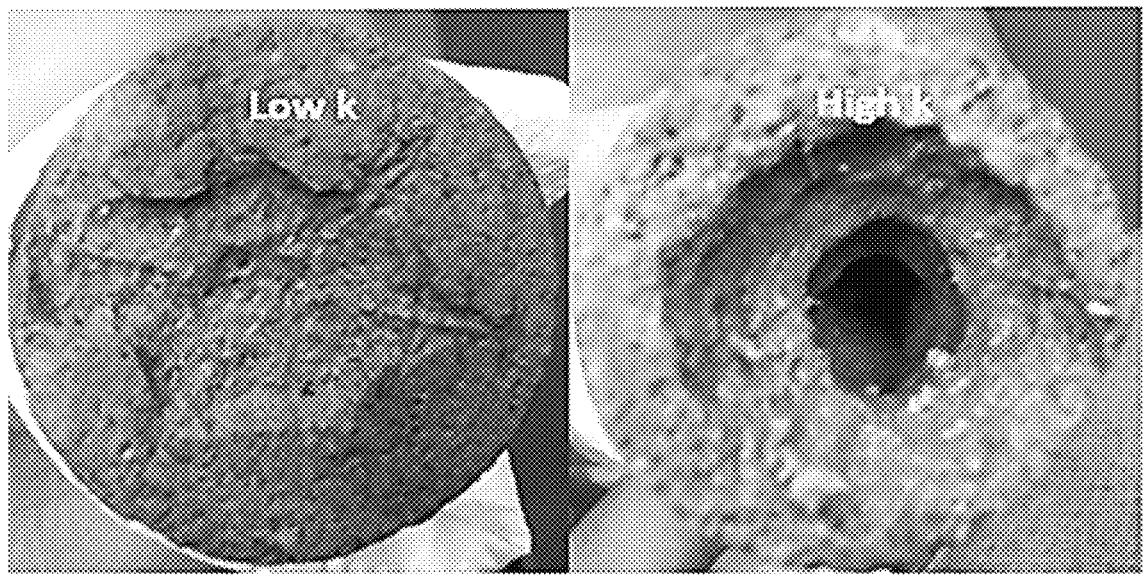
FIG. 26 shows photographs of the inlet (upper) and outlet (lower) ends of cores used in Test P1 with 15 wt % HCl.
Figure 26:
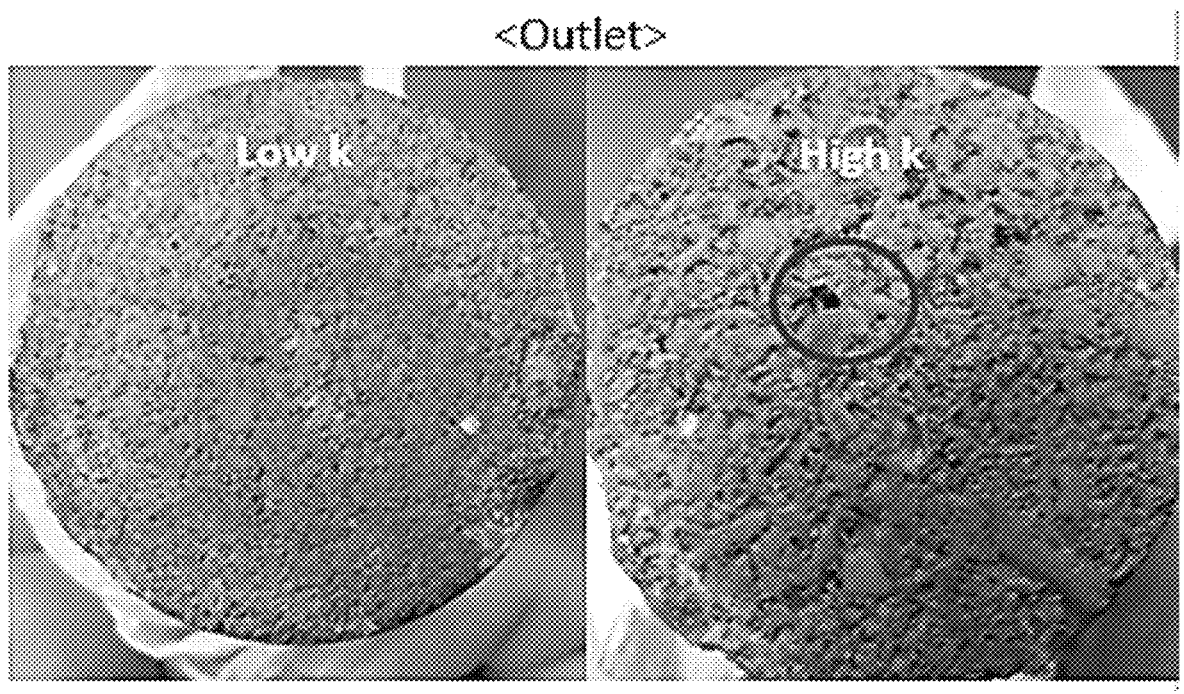
Figure 27:
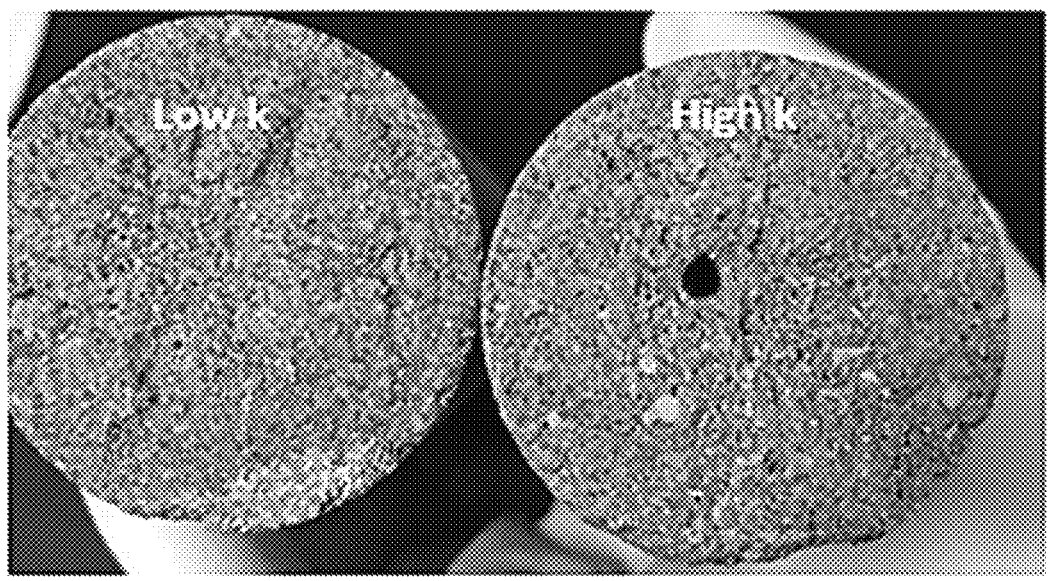
FIG. 27 shows photographs of the inlet (upper) and outlet (lower) ends of cores used in Test P2 with 1.25 vol % Si+9 wt % $MgCl_2$+15 wt % HCl at room temperature.
Figure 27:
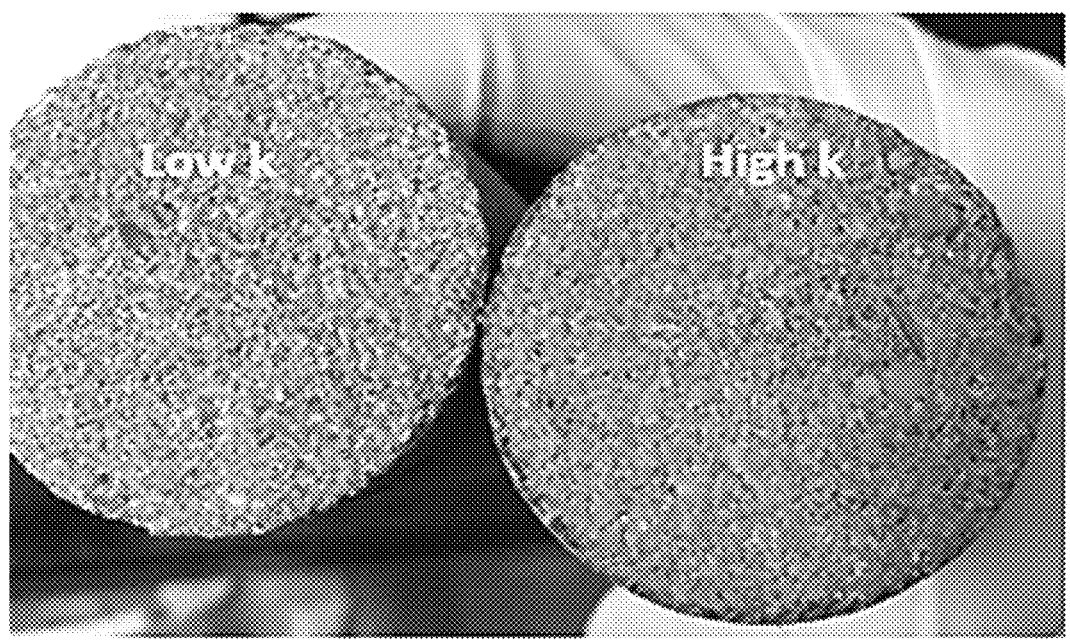
Figure 28:
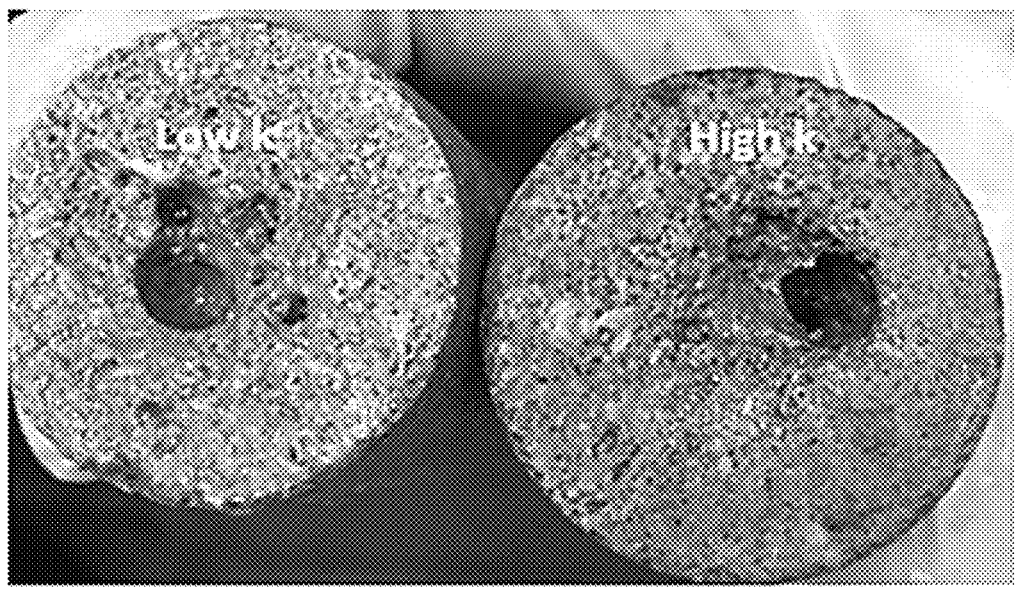
FIG. 28 shows photographs of the inlet (upper) and outlet (lower) ends of cores used in Test P3 with 1.25 vol % Si+9 wt % $MgCl_2$+15 wt % HCl at 90° C.
Figure 28:
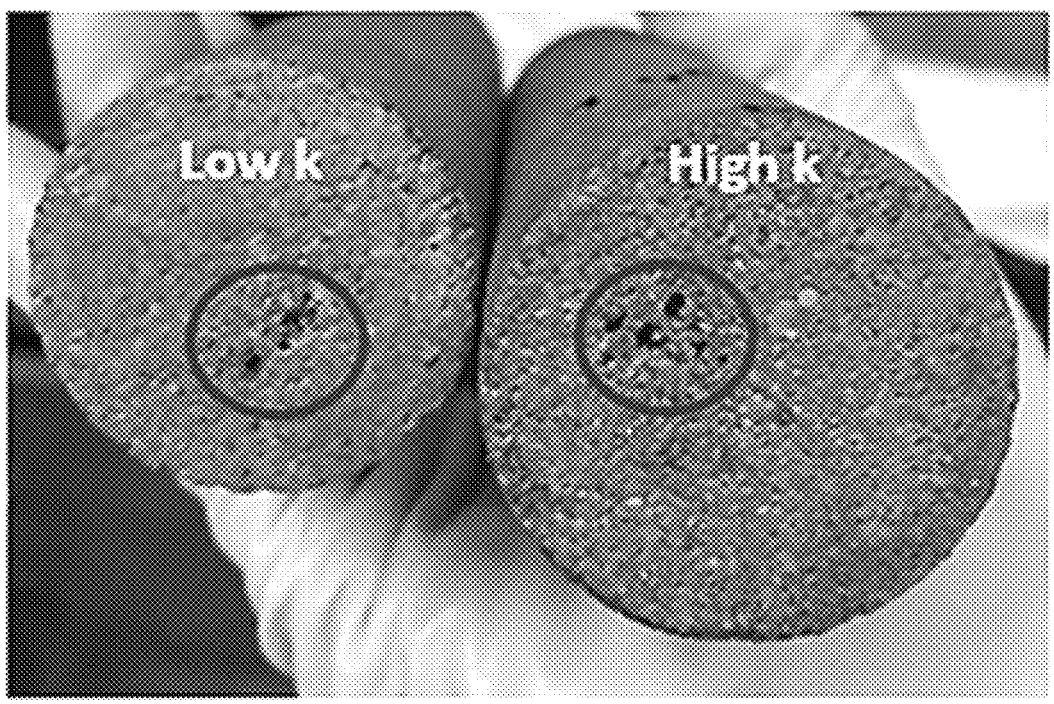

Only the higher perm core has a wormhole breakthrough in test P1 with 15 wt % HCl as shown in FIG. 26. This is because there is no in-situ gel to control conformance with viscosity boost. In FIG. 27, mild face dissolution was observed on the surface of low perm core inlet in test P2 with nanofluid at room temperature. Acid reaction rate was not enough to create wormhole breakthrough on the outlet of both cores. Thus, there is no acid breakthrough both cores. Test P3 with nanofluid at 90° C. has successfully divert the acid into low perm core. As shown in FIG. 28, first breakthrough in high perm core was obtained in 15 min and after 5 min another wormhole breakthrough was found in low perm core.

In conclusion, (1) sandpack test results confirm that 1.25 vol % Si+9 wt % MgCl$_2$ can form in-situ gel and plug both 200 and 3 Darcy formation, (2) injection strategy such as concentration of silica and injection rate significantly influence the performance of in-situ gelation. The concentration of silica is directly related to critical gelation concentration and the injection rate controls shear force which is crucial to adjust viscosity for shear thinning fluid, (3) from single coreflood tests, the results indicate that nanofluid can be successfully propagated and it has tendency to have multiple wormholes due to its in-situ gel property, and (4) single stage nanofluid (1.25 vol % Si+9 wt % MgCl$_2$+15% HCl) can successfully divert the acid into low permeability core after the acid breakthrough from the high permeability core.

These results show that the compositions disclosed herein exhibit significant differences from other technologies and prior art in at least five non-limiting aspects. First, they result in a pseudo-solid gel which exhibits both strength and rigidity even at a very low volume fraction of nanoparticles. The fumed metal oxide particle's surface properties are successfully modified with addition of MgCl$_2$ and blending with concentrated HCl. Once this treatment fluid directly contacts with carbonate rock, dissolution of the carbonate results in an increase of pH which leads to instantaneous generation of gel networks. The resulting gel exhibits pseudo-solid behavior when total particle volume fractions are kept greater than 0.75% v/v in the presence of 7 wt % MgCl$_2$ at room temperature (23° C.). At elevated temperature (90° C.) the same formulation with 15 wt % HCl added can produce instant soft gel networks which change to pseudo-solid gel after equilibrating for 35 minutes.

Second, the presently disclosed gel system exhibits distinct shear thinning behavior. When no shear rate is applied, the solution forms a gel and the gel can be completely transformed into a low viscosity fluid by increasing the shear rate. In other words, the gel viscosity or the mechanical strength can be easily manipulated by altering the operating shear rate during acidizing treatment operations. Thus, the newly developed formulations disclosed herein can be easily adjusted to apply for a variety of permeability contrast ratios between different depth of subterranean.

Third, the new formulation possesses excellent tolerance of harsh salt and temperature conditions. In one non-limiting example, a gel-producing, stable dispersion of nanoparticles was prepared with 20% of total dissolved solids (TDS) at 90° C.

Fourth, the newly disclosed formulation is also a single-stage acidizing system that achieves the dual purposes of self-diversion and deep penetration, and so eliminates the need for multiple-stage operations via injection of different fluids sequentially. This can minimize the number of treatment stages and project cost in field applications. Currently, applying different fluid systems in multiple stages acidizing treatment drastically increases the logistical issues and complexity at the field and is much less favorable for the operation. Thus, this newly developed formulation provides significant improvements and benefits for acidizing treatment practice, both technically and economically.

Fifth, the in-situ gelled acid can be used in other conformance control purposes such as reservoir management and environmental impact mitigation to drastically reduce unwanted water production and enhance recovery performance without significant injectivity losses. These new acidizing formulations will significantly reduce operator lifting costs and environmental concerns as well as maintaining the longevity of the producing wells. For example, these processes can impact oil shale production by providing an effective water cutoff treatment for wells that produce excessive amounts of unwanted formation water that are currently disposed of in salt-water injection wells, which have been connected to induced seismicity.

In non-limiting embodiments of the present disclosure, the gel precursor (pre-injection) composition comprises nanoparticles (e.g., silica) in the amount of from about 0.25 volume-percent (vol %) to about 2.5 vol %. More particularly, the gel precursor composition may comprise nanoparticles in the amount of from about 0.5 vol % to about 1.5 vol %. More particularly, the gel precursor composition may comprise nanoparticles in the amount of from about 0.75 vol % to about 1.25 vol %. For example, the gel precursor composition may comprise nanoparticles in the amount of from about 0.25 vol %, to about 0.3 vol %, to about 0.4 vol %, to about 0.5 vol %, to about 0.6 vol %, to about 0.7 vol %, to about 0.75 vol %, to about 0.8 vol %, to about 0.9 vol %, to about 1.0 vol %, to about 1.1 vol %, to about 1.2 vol %, to about 1.25 vol %, to about 1.3 vol %, to about 1.4 vol %, to about 1.5 vol %, to about 1.6 vol %, to about 1.7 vol %, to about 1.8 vol %, to about 1.9 vol %, to about 2.0 vol %, to about 2.1 vol %, to about 2.2 vol %, to about 2.3 vol %, to about 2.4 vol %, to about 2.5 vol %.

In non-limiting embodiments, the gel precursor composition comprises MgCl$_2$ in the amount of from about 1 weight-percent (wt %) to about 20 wt %. More particularly, the gel precursor composition may comprise $MgCl_2$ in the amount of from about 3 wt % to about 15 wt %. More particularly, the gel precursor composition may comprise $MgCl_2$ in the amount of from about 5 wt % to about 10 wt %. For example, the gel precursor composition may comprise $MgCl_2$ in the amount of from about 1 wt %, to about 2 wt %, to about 3 wt %, to about 4 wt %, to about 5 wt %, to about 6 wt %, to about 7 wt %, to about 8 wt %, to about 9 wt %, to about 10 wt %, to about 11 wt %, to about 12 wt %, to about 13 wt %, to about 14 wt %, to about 15 wt %, to about 16 wt %, to about 17 wt %, to about 18 wt %, to about 19 wt %, to about 20 wt %.

In non-limiting embodiments, the gel precursor composition (pre-injection) comprises an acidifying agent such as HCl (or any suitable inorganic or organic acid, e.g., citric or acetic) in the amount of from about 0.01 weight-percent (wt %) to about 30 wt %. More particularly, the gel precursor composition comprises an acidifying agent in the amount of from about 0.05 wt % to about 30 wt %. More particularly, the gel precursor composition comprises an acidifying agent in the amount of from about 0.1 wt % to about 25 wt %. More particularly, the gel precursor composition comprises an acidifying agent in the amount of from about 1 wt % to about 20 wt %. For example, the gel precursor composition comprises an acidifying agent in the amount of from about 0.01 wt %, to about 0.02 wt %, to about 0.03 wt %, to about 0.04 wt %, to about 0.05 wt %, to about 0.06 wt %, to about 0.07 wt %, to about 0.08 wt %, to about 0.09 wt %, to about 0.1 wt %, to about 0.2 wt %, to about 0.3 wt %, to about 0.4 wt %, to about 0.5 wt %, to about 0.6 wt %, to about 0.7 wt %, to about 0.8 wt %, to about 0.9 wt %, to about 1 wt %, to about 2 wt %, to about 3 wt %, to about 4 wt %, to about 5 wt %, to about 6 wt %, to about 7 wt %, to about 8 wt %, to about 9 wt %, to about 10 wt %, to about 11 wt %, to about 12 wt %, to about 13 wt %, to about 14 wt %, to about 15 wt %, to about 16 wt %, to about 17 wt %, to about 18 wt %, to about 19 wt %, to about 20 wt %, to about 21 wt %, to about 22 wt %, to about 23 wt %, to about 24 wt %, to about 25 wt %, to about 26 wt %, to about 27 wt %, to about 28 wt %, to about 29 wt %, to about 30 wt %.

In non-limiting embodiments, the gel precursor composition (pre-injection) comprises a viscosity in a range of about 1 cp (centipoise) to about 15 cp. More particularly, the gel precursor composition comprises a viscosity in a range of about 1 cp to about 10 cp. More particularly, the gel precursor composition comprises a viscosity in a range of about 1 cp to about 5 cp. More particularly, the gel precursor composition comprises a viscosity in a range of about 1 cp to about 2 cp. For example, the gel precursor composition may comprise a viscosity of about 1 cp, to about 2 cp, to about 3 cp, to about 4 cp, to about 5 cp, to about 6 cp, to about 7 cp, to about 8 cp, to about 9 cp, to about 10 cp, to about 11 cp, to about 12 cp, to about 13 cp, to about 14 cp, to about 15 cp.

In non-limiting embodiments, the gel precursor composition is injected into the subterranean formation at a flow rate that provides a shear rate of the gel precursor in a range of about $0.0\ s^{-1}$ to about $100\ s^{-1}$ after which the gel precursor turns into a gel within the subterranean formation, the gel comprising a viscosity a the range of about $10^2$ cp to about $10^{10}$ cp, such as for example, from about $10^2$ cp, to about $10^3$ cp, to about $10^4$ cp, to about $10^5$ cp, to about $10^6$ cp, to about $10^7$ cp, to about $10^8$ cp, to about $10^9$ cp, to about $10^{10}$ cp.

Optionally after the stimulation step is finished, the gel can be broken within the formation by the addition of water to dilute the nanoparticle/$MgCl_2$ concentration of the gel, or by adjusting the pH of the gel to a pH of about 1 or 2, or by any other suitable method.

In non-limiting embodiments, the temperature of the subterranean formation into which the compositions of the present disclosure are injected may be in a range of from about 65° C. to about 250° C. For example, the subterranean formation temperature may be in a range of from about 65° C., to about 70° C., to about 75° C., to about 80° C., to about 85° C., to about 90° C., to about 95° C., to about 100° C., to about 105° C., to about 110° C., to about 115° C., to about 120° C., to about 125° C., to about 130° C., to about 135° C., to about 140° C., to about 145° C., to about 150° C., to about 155° C., to about 160° C., to about 165° C., to about 170° C., to about 175° C., to about 180° C., to about 185° C., to about 190° C., to about 195° C., to about 200° C., to about 205° C., to about 210° C., to about 215° C., to about 220° C., to about 225° C., to about 230° C., to about 235° C., to about 240° C., to about 245° C., to about 250° C.

Further work and results, including mathematical modeling, are shown in U.S. Provisional Application Ser. No. 62/757,608, which is incorporated herein by reference in its entirety.

What is claimed is:

1. A method for in situ acid stimulation of a subterranean formation having a temperature, wherein the subterranean formation is a carbonate formation, comprising:
   contacting the subterranean formation with an aqueous gel precursor composition comprising:
   silica nanoparticles;
   magnesium chloride ($MgCl_2$); and
   hydrochloric acid (HCl), wherein the aqueous gel precursor composition has a low viscosity at a shear rate at which the aqueous gel precursor is injected into the subterranean formation, wherein the low viscosity is in a range of about 1 centipose (cp) to about 15 cp, and forms a gel at the temperature of the subterranean formation.

2. The method of claim 1, wherein the silica nanoparticles comprise up to about 2.5 vol % of the aqueous gel precursor composition.

3. The method of claim 1, wherein the $MgCl_2$ comprises up to about 20 wt % of the aqueous gel precursor composition.

4. The method of claim 1, wherein the HCl comprises up to about 30 wt % of the aqueous gel precursor composition.

5. The method of claim 1, wherein the shear rate is in a range of $0.0\ s^{-1}$ to about $100\ s^{-1}$.

6. The method of claim 1, wherein the temperature of the subterranean formation is at least about 65° C.

7. The method of claim 1, wherein the pH of the aqueous gel precursor composition is about 3.

8. A method of enhancing oil and/or gas recovery from a subterranean formation, wherein the subterranean formation is a carbonate formation, comprising:
   contacting the subterranean formation with an aqueous gel precursor composition comprising:
   silica nanoparticles;
   magnesium chloride ($MgCl_2$); and
   hydrochloric acid (HCl), wherein the aqueous gel precursor composition has a low viscosity at a shear rate at which the aqueous gel precursor is injected into the subterranean formation, wherein the low viscosity is in a range of about 1 centipose (cp) to about 15 cp, and forms a gel at a temperature of the subterranean formation; and recovering oil and/or gas from the subterranean formation.

9. The method of claim 8, wherein the silica nanoparticles comprise up to about 2.5 vol % of the aqueous gel precursor composition.

10. The method of claim 8, wherein the $MgCl_2$ comprises up to about 20 wt % of the aqueous gel precursor composition.

11. The method of claim 8, wherein the HCl comprises up to about 30 wt % of the aqueous gel precursor composition.

12. The method of claim 8, wherein the shear rate is in a range of $0.0\ s^{-1}$ to about $100\ s^{-1}$.

13. The method of claim 8, wherein the temperature of the subterranean formation is at least about 65° C.

14. The method of claim 8, wherein the pH of the aqueous gel precursor composition is about 3.

* * * * *